United States Patent
Davis et al.

(10) Patent No.: US 7,263,111 B1
(45) Date of Patent: Aug. 28, 2007

(54) SYSTEM AND METHOD FOR INTERCONNECTING DIFFERENT SS7 NETWORK DOMAINS

(75) Inventors: Robert Wayne Davis, Dallas, TX (US); Thomas Lamar George, Jr., Plano, TX (US)

(73) Assignee: Alcatel Lucent, Paris (FR)

( * ) Notice: Subject to any disclaimer, the term of this patent is extended or adjusted under 35 U.S.C. 154(b) by 1125 days.

(21) Appl. No.: 10/213,155

(22) Filed: Aug. 5, 2002

Related U.S. Application Data

(60) Provisional application No. 60/316,153, filed on Aug. 30, 2001.

(51) Int. Cl.
*H04J 3/12* (2006.01)
(52) U.S. Cl. .................................. 370/522
(58) Field of Classification Search ............... 370/373, 370/377, 400–405, 384–385, 410, 426, 467, 370/496, 522; 455/401, 466
See application file for complete search history.

(56) References Cited

U.S. PATENT DOCUMENTS

| | | | | |
|---|---|---|---|---|
| 6,308,276 | B1* | 10/2001 | Ashdown et al. | 726/11 |
| 6,477,566 | B1* | 11/2002 | Davis et al. | 709/223 |
| 6,920,144 | B2* | 7/2005 | Niermann | 370/401 |
| 7,006,433 | B1* | 2/2006 | Dantu et al. | 370/218 |
| 2002/0126826 | A1* | 9/2002 | Pasanen et al. | 379/229 |
| 2003/0016684 | A1* | 1/2003 | Prasad et al. | 370/410 |

OTHER PUBLICATIONS

"Savvi ST, Tunneling Gateway," RadiSys.; http://www.radisys.com/oem_products/ds-page.cfm?ProductDatasheetsID=1051; 3 pages; Jun. 20, 2002.
"Savvi SG, Signaling Gateway," RadiSys.; http://www.radisys.com/oem_products/ds-page.cfm?ProductDatasheetsID=1045; 3 pages; Jun. 20, 2002.
"SEGway SS7 Network Replacement Solutions," Performance Technologies; http;//www2.pt.com/products/prod_segway_ntwksolution.html; 3 pages; Jun. 20, 2002.

* cited by examiner

*Primary Examiner*—Chi Pham
*Assistant Examiner*—Thai Hoang
(74) *Attorney, Agent, or Firm*—Craig A. Hoersten; Danamraj & Youst, P.C.

(57) ABSTRACT

A system and method for interconnecting two network domains operable to transport SS7 traffic of different types. A gateway disposed between a first network domain and a second network domain includes a generic Interworking functionality that is operable to effectuate an MTP2-based relay linkage between a first MTP2 interface and a second MTP2 interface. A first link segment is established between the gateway's first MTP2 interface and an equivalent interface in the first network domain's end node. A second link segment is established between the gateway's second MTP2 interface and a corresponding equivalent interface in the second network domain's end node. Thereafter, the relay linkage coupling the link segments is established for facilitating MTP2 traffic therebetween.

56 Claims, 14 Drawing Sheets

| Primitive | .req | .ind | .rsp | .cfm | Param 1 | Param 2 | Param 3 |
|---|---|---|---|---|---|---|---|
| M2-Transmit | X | | | | M2Link (in) | MSU (in) | |
| M2-Receive | | X | | | M2Link (out) | MSU (out) | FSN (out) |
| M2-Tx-Congestion-Onset | | X | | | M2Link (out) | Level (out) | |
| M2-Tx-Congestion-Abate | | X | | | M2Link (out) | Level (out) | |
| M2-Emergency | X | | | | M2Link (in) | | |
| M2-Emergency-Cease | X | | | | M2Link (in) | | |
| M2-Start | X | | | | M2Link (in) | | |
| M2-Stop | X | | | | M2Link (in) | | |
| M2-In-Service | | X | | | M2Link (out) | | |
| M2-Out-Of-Service | | X | | | M2Link (out) | Reason (out) | |
| M2-Retrieve-BSNT | X | | | | M2Link (in) | | |
| M2-Retrieve-MSU | X | | | | M2Link (in) | FSNC (in) | |
| M2-Retrieval-MSU | | X | | | M2Link (out) | MSU (out) | |
| M2-Retrieval-Complete | | X | | | M2Link (out) | | |
| M2-Retrieval-BSNT | | X | | | M2Link (out) | BSNT (out) | |
| M2-Flush-Buffers | X | | | | M2Link (in) | | |
| M2-Continue | X | | | | M2Link (in) | | |
| M2-Non-Retrievable | | X | | | M2Link (out) | | |
| M2-Local-Proc-Outage | X | | | | M2Link (in) | | |
| M2-Remote-Proc-Outage | | X | | | M2Link (out) | | |
| M2-Rx-Congestion-Onset | X | | | | M2Link (in) | | |
| M2-Rx-Congestion-Abate | X | | | | M2Link (in) | | |
| M2-Remote-Emergency | | X | | | M2Link (out) | | |
| M2-Remote-Emergency-Cease | | X | | | M2Link (out) | | |

| Procedure Block | Description |
|---|---|
| Link Creation Block 902 | Create a new M2Link in an M2Interface. |
| Link Deletion Block 904 | Delete an existing M2Link in an M2Interface. |
| Link Activation Block 906 | In response to automatic or manual controls, bring a link in the Out-Of Service or Failed states into In-Service state providing it can pass alignment and proving procedure. |
| Link Deactivation Block 908 | In response to automatic or manual controls, bring a link in the In-Service state into Out-Of-Service state. |
| Link Alignment Block 910 | Link endpoints exchange control information to synchronize start of the Proving procedure. |
| Link Proving Block 912 | Link endpoints exchange information intending to demonstrate the link should be capable of performing acceptability once placed into the In-Service state. |
| MSU Transmission Block 914 | Procedure to transfer MSU from local Link User to remote Link User without error and in sequence relative to other MSUs on the link. |
| MSU Reception Block 916 | Procedure to guarantee that MSUs received from remote Link User are delivered to local Link User without error and in sequence relative to other MSUs on the link. |
| Error Monitoring Block 918 | Procedure to continuously monitor the ability of the Link to transfer MSUs acceptably between Link endpoints and initiate Link Deactivation procedure if not. |
| Transmit Congestion Handling Block 920 | Procedure to detect and notify Link User of congestion conditions at the local Link transmitter. |
| Receive Congestion Handling Block 922 | Procedure to detect and notify remote Link endpoint of congestion conditions at the local Link receiver. |
| Processor Outage Handling Block 924 | Procedure to transfer Local Processor Outage condition at one Link User to remote Link User rapidly in order to minimize message loss. |

*FIG. 9*

SYSTEM AND METHOD FOR INTERCONNECTING DIFFERENT SS7 NETWORK DOMAINS

PRIORITY UNDER 35 U.S.C. §119(e) & 37 C.F.R. §1.78

This nonprovisional application claims priority based upon the following prior U.S. provisional patent application entitled: "Generic MTP2 Relay Interworking Functionality," Application No. 60/316,153, filed Aug. 30, 2001, in the names of R. Wayne Davis, William J. Frome II, Thomas Lamar George, Jr., Lawrence E. Banks, and Serge F. Fourcand, which is hereby incorporated by reference.

CROSS-REFERENCE TO RELATED APPLICATION(S)

This application discloses subject matter related to the subject matter disclosed in the following commonly owned co-pending patent application(s): (i) "System And Method For Transporting IN/AIN Signaling Over An Internet Protocol (IP) Network," application Ser. No. 09/651,307, filed Aug. 30, 2000, in the names of Ramanamurthy Dantu, R. Wayne Davis and Thomas Lamar George, Jr., which is hereby incorporated by reference.

BACKGROUND OF THE INVENTION

1. Technical Field of the Invention

The present invention relates to telecommunication networks. More particularly, and not by way of any limitation, the present invention relates to a system and method for interconnecting a network domain carrying Signaling System No. 7 (SS7) traffic in one type with another network domain operable to carry SS7 traffic of a different type.

2. Description of Related Art

Out-of-band signaling establishes a separate channel for the exchange of signaling information between call component nodes in order to set up, maintain and service a call in a telephony network. Such channels, called signaling links, are used to carry all the necessary signaling messages between the nodes. Thus, for example, when a call is placed, the dialed digits, trunk selected, and other pertinent information are sent between network switches using their signaling links, rather than the trunks which will ultimately carry the bearer traffic, i.e., conversation.

Out-of-band signaling has several advantages that make it more desirable than traditional in-band signaling. First, it allows for the transport of more data at higher speeds than multi-frequency (MF) outpulsing used in the telephony networks without it. Also, because of separate trunks and links, signaling can be done at any time in the entire duration of the call, not just at the beginning. Furthermore, out-of-band signaling enables signaling to network elements to which there is no direct trunk connection.

Signaling System No. 7 (SS7) provides a packet-based signaling architecture that has become the out-of-band signaling scheme of choice between telephony networks and between network elements worldwide. Three essential components are defined in a signaling network based on SS7 architecture. Signal Switching Points (SSPs) are basically telephone switches equipped with SS7-capable software that terminate signaling links. SSPs generally originate, terminate, or switch calls. Signal Transfer Points (STPs) are the packet switches of the SS7 network. In addition to certain specialized functions, they receive and route incoming signaling messages towards their proper destination. Finally, Service Control Points (SCPs) are databases that provide information necessary for advanced call-processing and Service Logic execution.

As is well known, SS7 signaling architecture, effectuated as a multi-layered protocol over a Time Division Multiplex (TDM) transport, is standardized under the American National Standards Institute (ANSI) and the International Telecommunications Union (ITU) to operate as the common "glue" that binds the ubiquitous autonomous networks together so as to provide a "one network" feel that telephone subscribers have come to expect. Furthermore, SS7 signaling has made it possible to provision a host of advanced services (or, Value-added Services) based on Intelligent Network (IN)/Advanced Intelligent Network (AIN) architectures in both wireless and wireline telecommunications networks.

Due to the phenomenal growth in popularity of the Internet, there has been a tremendous interest in using packet-switched network (PSN) infrastructures (e.g., those based on Internet Protocol (IP) addressing) as a replacement for, or as an adjunct to, the existing circuit-switched network (CSN) infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Additional factors that are driving the current trend in transporting the bearer traffic on integrated and/or hybrid networks are: improvements in the quality of Voice-over-IP (VoIP) telephony; the Internet phenomenon; emergence of standards; cost-effective price-points for advanced services via media-rich call management, et cetera. Some of the emerging standards in this area are the well known H.323 protocol, developed by the ITU, Session Initiation Protocol (SIP) or Internet Protocol Device Control (IPDC) by the Internet Engineering Task Force (IETF), or Simple/Media Gateway Control Protocol (SGCP or MGCP). Using these IP-based standards, devices such as personal computers can inter-operate seamlessly in a vast inter-network, sharing a mixture of audio, video, and data across all forms of packet-based networks which may interface with circuit-switched network portions.

To seamlessly integrate carrier-grade service architectures within IP-based networks, it has therefore become necessary to provide the capability to transport out-of-band signaling information (such as the SS7 signaling) on IP connections also. In a well-known arrangement, for example, such SS7-over-IP transport utilizes a connection-oriented IP transport protocol, called Stream Control Transmission Protocol (SCTP), for transmitting SS7 signaling messages across the network elements. Clearly, it is highly desirable that such transport not disrupt or degrade the capabilities of the signaling network, as they are essential in effectuating various advanced services. In particular, it is necessary for applications involving the higher layers of the SS7 protocol (e.g., Transaction Capabilities Application Part or TCAP, Signaling Connection Control Part or SCCP, or various User Parts such as ISDN User Part or ISUP, Telephony User Part or TUP, and Data User Part or DUP) to operate without any degradation when the SS7 messages are transported by means of SCTP. That is, message dialogs (e.g., call setup, etc.) in these applications should remain unaffected even when the messages are sent over IP (transport-independency). Accordingly, SS7-over-IP mechanisms are required to satisfy the following requirements which are traditionally provisioned in pure SS7 networks:

High reliability;
High availability;
Short error handling time; and
Extremely low error rates.

In general, the functionality of the lower Message Transfer Part (MTP) portion of the SS7 protocol (Level-2 MTP (MTP2) and Level-3 MTP (MTP3) layers, in particular) is responsible for link control and management, network reliability, error handling, etc. Consequently, the MTP functionality of the messages must be preserved as much as possible as they are transported over SCTP.

Based on the foregoing discussion, it should be evident that traditional SS7 networks (using TDM as transport mechanism) are being required to coexist with networks having non-traditional SS7 links, e.g., SS7-over-IP links. Accordingly, there is a need to provide seamless functionality to interconnect an SS7 link operating in one domain with another SS7 link in a different domain. Traditional solutions for coupling two SS7 links typically have typically required the use of MTP3 routing layer, thereby necessitating highly complex implementation.

SUMMARY OF THE INVENTION

Accordingly, the present invention is directed to an innovative solution for interconnecting two SS7-capable network domains without involving the MTP3 routing layer. A gateway disposed between a first network domain and a second network domain includes a generic Interworking functionality that is operable to effectuate an MTP2-based relay linkage between a first MTP2 interface and a second MTP2 interface. A first link segment is established between the gateway's first MTP2 interface and an equivalent interface in the first network domain's end node. A second link segment is established between the gateway's second MTP2 interface and a corresponding equivalent interface in the second network domain's end node. Thereafter, the relay linkage coupling the link segments is established for facilitating MTP2 traffic therebetween. In an exemplary embodiment, the relay linkage is provided as a generic structure such that any two MTP2 interfaces can be interconnected regardless of their type.

BRIEF DESCRIPTION OF THE DRAWINGS

A more complete understanding of the present invention may be had by reference to the following Detailed Description when taken in conjunction with the accompanying drawings wherein:

FIG. 8 is a table of various message primitives operable to effectuate an IWF between two MTP2 links in accordance with the teachings of the present invention;

FIG. 9 is a table of various procedures operable as part of the IWF of the present invention;

DETAILED DESCRIPTION OF THE DRAWINGS

Figure 1:
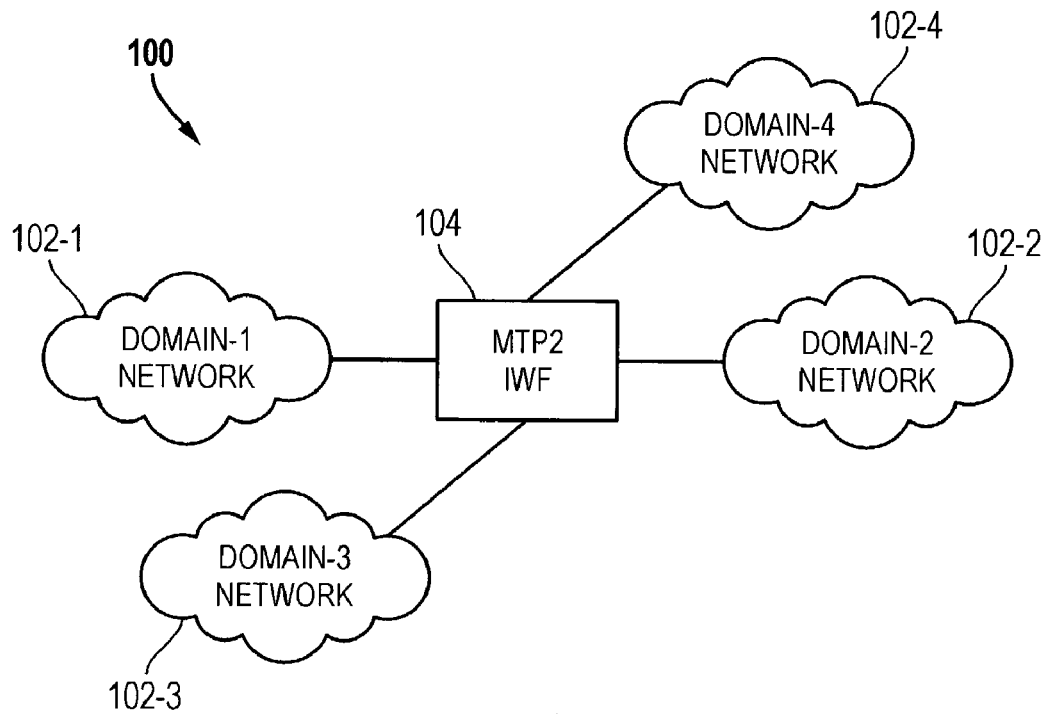
FIG. 1 depicts a communications network arrangement wherein a plurality of network domains are coupled together with a generic interworking function (IWF) provided in accordance with the teachings of the present invention.

In the drawings, like or similar elements are designated with identical reference numerals throughout the several views thereof, and the various elements depicted are not necessarily drawn to scale. Referring now to FIG. 1, depicted therein is a communications network arrangement 100 having a plurality of network domains 102-1 through 102-4 coupled together with a generic interworking function (IWF) 104 provided in accordance with the teachings of the present invention. Functionally, the IWF structure 104 is operable to join any SS7 MTP Level 2 (hereinafter MTP2 or M2) interface type to any other MTP2 interface type for the purpose of exchanging SS7 traffic. Accordingly, a common application of the IWF structure is the creation of a general-purpose SS7 Link Level gateway system.

Network domains 102-1 through 102-4 are exemplary of any network operable to carry SS7 traffic regardless of the underlying transport mechanism and associated physical media. For instance, a network domain can be a conventional SS7 network, whereas another network domain interconnected therewith via the IWF 104 may be comprised of a packet-switched network based on IP that uses a connection-oriented transport protocol called Stream Control Transmission Protocol (SCTP). Again, regardless of the network architecture, the IWF 104 is operable to join two or more SS7 end nodes, i.e., Signaling Points (SPs) such as conventional SP nodes (e.g., STPs) or IP-based SP nodes. Moreover, the IP nodes are exemplary of various IP-interfaced nodes such as, e.g., IP Signaling Endpoints (IPSEPs), IP Signal Transfer Points (IPSTPs), IP Signal Switching Points (IPSSPs), IP Service Control Points (IPSCPs), and the like. In one exemplary embodiment, preferably, the communications network arrangement 100 is architected with respect to the IWF structure 104 such that there is network-level redundancy in SS7 links, i.e., failure of a link effectuated by the IWF will not result in re-routing of the SS7 traffic carried by it. Also, relatedly, the MTP2 IWF structure itself be provided with redundancy.

Figure 2:
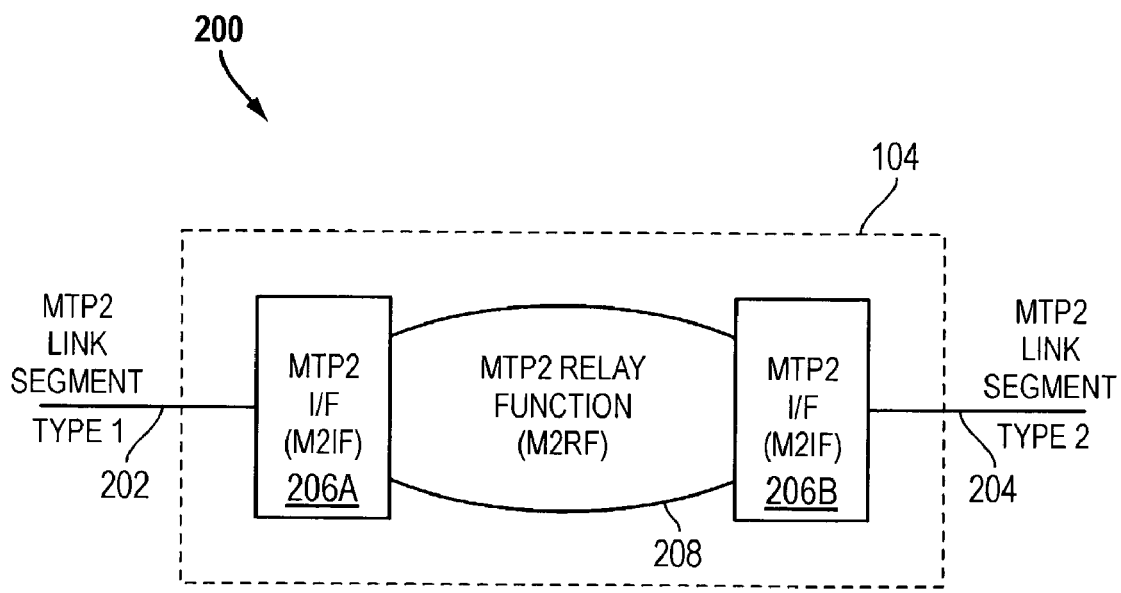
FIG. 2 depicts a high-level functional block diagram of an IWF structure for establishing a relay linkage between two MTP2 link segments in order to effectuate an MTP2 link between two SS7 end nodes.

In accordance with the teachings of the present invention, an M2 Relay Function (RF) structure is provided as part of the generic IWF element 104, which M2RF structure is responsible for creating a direct linkage between two SS7 link segments of different types. As will be seen in greater detail hereinbelow, the generic IWF element 104 thus includes two or more M2 interfaces, each of which is operable in association with a particular type of link segment. FIG. 2 depicts a high-level functional block diagram of the IWF structure 104 that includes an M2RF structure 208 for establishing a direct linkage between two exemplary MTP2 link segments 202 and 204, each of which is connected to a respective SS7 end node (not shown). A first M2 interface (M2IF) 206A operable with MTP2 link segment 202 of one type and a second M2 interface 206B operable with MTP2 link segment 204 of another type are adjoined via the linkage established by the M2RF structure 208 to effectuate an SS7 link between the two end nodes.

Figure 3:
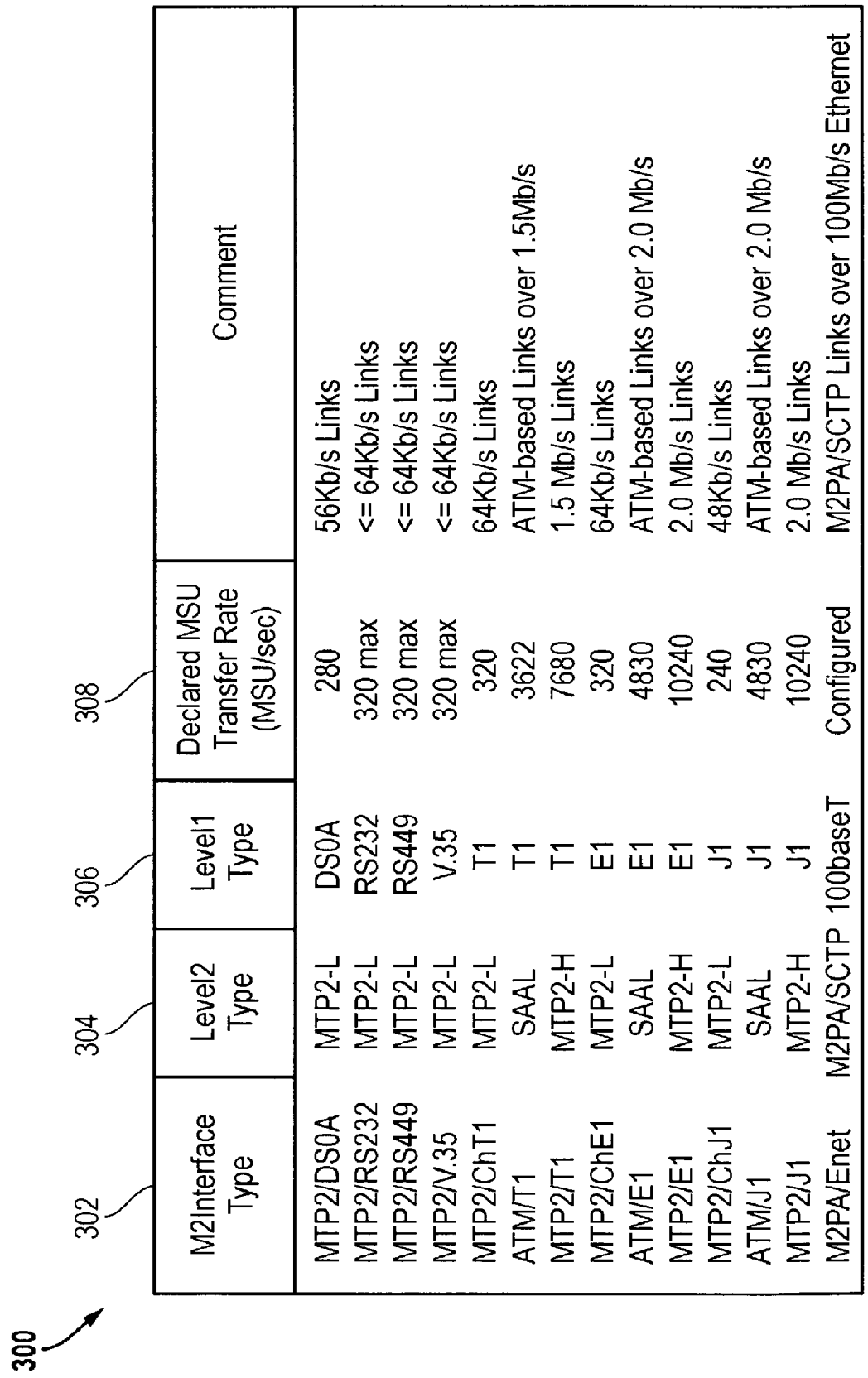
FIG. 3 is a table of different MTP2 interface types that can be interlinked in accordance with the teachings of the present invention.

It should be appreciated by those skilled in the art that although only two M2 interfaces are exemplified in FIG. 2, a number of such interfaces can be supported by the M2RF structure so as to effectuate generic interworking functionality between any two network domains of disparate type. For instance, FIG. 3 depicts a table 300 of different M2 interface types that can be interlinked via the M2RF of the present invention. Reference numeral 302 refers to the plurality of M2 interfaces exemplary of the SS7 interfaces contemplated within the ambit of the present invention. Reference numerals 304 and 306 refer to the Level 2 and Level 1 protocol types, respectively, applicable with respect to the first two layers of the layered communications infrastructure of the link segment types supported by the M2RF. The Level 1 type refers to the physical media operable with, e.g., DS0, RS232, RS449, V.35, T1, E1, J1 and various Ethernet types. The Level 2 type includes conventional MTP2 protocols as well as Signaling ATM-Adaptation Layers (e.g., SAAL) for ATM-based links and SCTP for IP-based links. In one aspect, the Level 2 type for IP-based links may involve a special protocol such as the MTP2 User Adaptation (M2UA) layer or the MTP2 Peer-to-Peer Adaptation (M2PA) layer described in the following co-pending U.S. patent application, "System And Method For Transporting IN/AIN Signaling Over An Internet Protocol (IP) Network," application Ser. No. 09/651,307, filed Aug. 30, 2000, cross-referenced above and incorporated by reference herein.

As will be seen in greater detail below, the M2RF structure 208 is operable to establish a link segment of particular type whose transfer rate with respect to MTP2 Message Signal Units (MSUs) is dependent upon the Level 2 and Level 1 types. Reference numeral 308 refers to the MSU rates associated with the M2 interface types exemplified in the table 300. Furthermore, the M2RF structure 208 is operable to manage the overall bandwidth of the IWF by managing the transfer rate of the individual linkages and link segments supported thereby.

Figure 4:
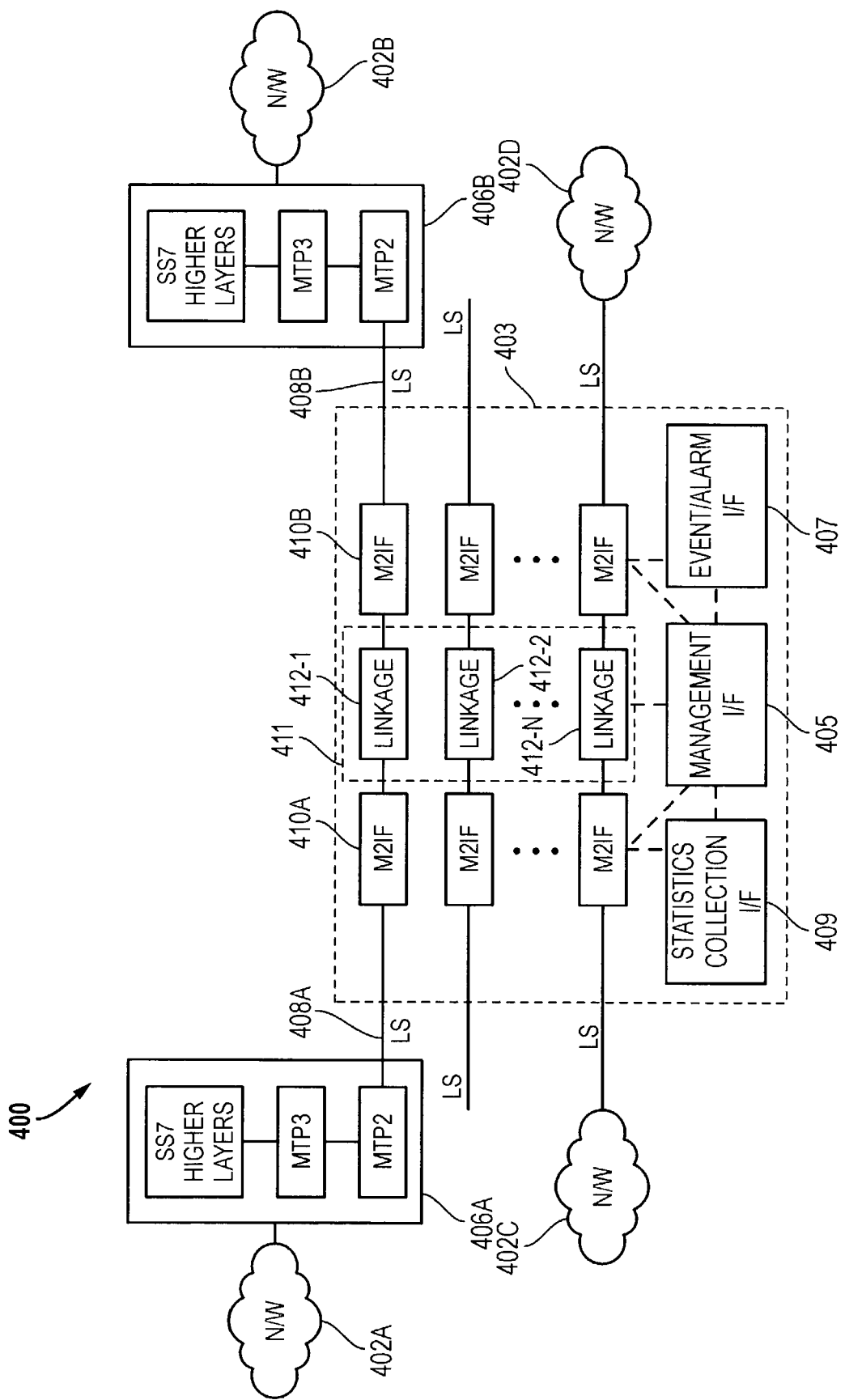
FIG. 4 depicts a high-level functional block diagram of an embodiment of the IWF of the present invention for interlinking any two MTP2 link types in accordance with the teachings of the present invention.

It will be recognized that the generic IWF structure of the present invention may be implemented as a separate network element such as an MTP2 gateway. In other arrangements, the IWF structure may be integrated within a SEP of one of the interconnected network domains. Regardless of the specific implementation, the M2RF structure of the IWF is operable to support multiple interfaces and thus effectuate a particular linkage between any two M2IFs depending on the adjoined link segment types. FIG. 4 depicts a high-level functional block diagram of an embodiment of the IWF as a gateway device 403 operable to support a plurality of linkages for interlinking any two MTP2 link segment types in accordance with the teachings of the present invention. Similar to the network arrangement 100 shown in FIG. 1, reference numeral 400 refers to a communications network arrangement wherein a plurality of network domains 406A-D can be interconnected via the gateway device 403. The gateway device accordingly includes at least one M2RF structure 411 that can support a plurality of linkages 412-1 through 412-N, each of which may be effectuated between two M2 interfaces that operate in association with the link segments connected thereto. Associated with the M2RF of the gateway device 403 is at least one management interface 405 responsible for the overall operations, administration and maintenance (OA&M) of the gateway as well as its configuration in terms of the total number of link segments, list of all M2 interfaces supported, MSU transfer rates, etc.

By way of illustration, SEP 406A associated with network domain 402A and SEP 406B associated with network domain 402B are coupled via linkage 412-1, which is established between M2IF 410A and M2IF 410B. Link segment 408A is established between MTP2 of SEP 406A and M2IF 410A. Likewise, adjoining link segment 408B is established between M2IF 410B and MTP2 (or, a suitable adaptation layer thereof) of SEP 406B. It should be appreciated that the link segments 408A and 408B may be independently created, activated, and aligned, before the linkage 412-1 therebetween is established. As will be seen below, each of these processes may be controlled by its own state transition behavioral model that allows maximum flexibility.

The various functional and structural aspects of the gateway device 403 are preferably determined by the configuration models used for its constituent components, namely, M2RFs, M2IFs, linkages, and link segments. The configuration models themselves may be patterned after object modeling techniques, wherein each object modeled can exist independently of its identifiers. It should be evident, however, that the actual implementation may or may not be object-oriented as long as the illustrative configuration requirements are met.

In one exemplary embodiment, the gateway device 403 requires the following information as part of its configuration: list of all M2 interfaces per M2RF, list of M2 linkages currently configured, maximum number of M2 link segments that may be configured in the gateway (which is derived from the M2 interface configuration information), and maximum number of M2 linkages that may be configured therein. The M2 interface configuration items include: M2 interface type (e.g., the interface types summarized in table 300 of FIG. 3), maximum number of M2 link segments supported on the particular M2IF, list of all M2 link segments created on the M2IF, and maximum declared MSU transfer rate for all the M2 links created on the M2IF.

Each M2 link segment created on a supported M2IF must also know certain minimum information about the adjacent Signaling Point (SP). For instance, adjacent SP configuration items include the SS7 Point Code of the SP (which may be determined from the Signaling Link Test Messages (SLTMs)) and the type/format of the Point Code. In addition, all M2 link segments in a selected M2IF that are joined by the M2RF are preferably provided with the following configuration items: adjacent SP, Link Set name (which can be optionally entered by network operator), Signaling Link Code (SLC, determined from MTP3 messages), M2IF type (e.g., MTP2/DS0, ATM/T1, etc.), declared MSU transfer rate (which may be hard-coded for some link types), actual MSU transfer rate (derived from current M2 link statistics), link state (e.g., out-of-service, proving, in-service, etc.), activation state (activated or deactivated), and M2 linkage (if one created and assigned for the particular M2 link segment). As will be seen below, configuration items such as MSU transfer rates will be used in the overall bandwidth management by the gateway device.

The M2RF configuration items typically include: list of M2 interfaces supported by the M2RF, maximum number of M2 linkages supported (which can be derived from assigned M2 interfaces), activation state (Activated or Deactivated), linkage state (Out-Of-Service, Proving, In-Service, etc.), and declared MSU transfer rate (determined from declared MSU rates of joined M2 link segments). In turn, each linkage in the M2RF is preferably provided with the following configuration items: link segment 1 and link segment 2 that are joined by the linkage, activation state (Activated or Deactivated), various linkage states, and declared MSU transfer rate (which is determined from declared MSU rates of joined M2 link segments).

As alluded to hereinabove, the gateway device 403 includes management interface 405 which is used for managing the M2RF(s) residing therein. Any management interface variant may be implemented depending upon specific gateway system requirements. In one embodiment, the gateway device 403 is operable to support the following management interface types: (i) ASCII text command line interface, (ii) Simple Network Management Protocol (SNMP)-based interface, (iii) Telcordia Man-Machine Language (MML)-based interface, (iv) Common Management Interface/Service Element (CMISE)-based interface), and (v) Common Object Request Broker Architecture (CORBA)-based interface.

In addition, the gateway device 403 may also include an event/alarm interface 407 and a statistics collection interface 409, which may be integrated within the management interface 405. Some of the possible events that can be reported are: (i) M2 linkage failure to indicate that the identified M2 linkage that was previously activated has failed; (ii) M2 linkage in service to indicate that the identified M2 linkage that was previously activated has gone In-Service; and (iii) M2 linkage sequence failure to indicate that the identified M2 linkage has detected its first Forward Sequence Number (FSN) failure since going In-Service. The reporting entity with respect to each of these events is the particular M2 linkage structure supported by the M2RF. Further, some of the events may have alarms (with variable levels of severity) which typically require a specific action/response from the operator. For instance, an alarm may be provided with a M2 linkage failure event wherein the alarm may be designated as a "major" alarm which can be removed when the linkage is manually reset or the linkage returns to the In-Service state. Likewise, M2 linkage sequence failure may be associated with a "minor" alarm that can be removed when the afflicted linkage is manually reset or when it is re-activated.

The generic M2RF structure 411 of the gateway device 403 is also operable to monitor, evaluate and report various link-based and linkage-based statistics. The following table sets forth some of the exemplary statistics reported by the M2RF of the present invention:

TABLE 1

| Statistic | Entity | Units | Description |
| --- | --- | --- | --- |
| Total MSU transferred | M2 linkage | MSUs | Total MSUs transferred in both directions by the identified M2 linkage during the current reporting interval |

TABLE 1-continued

| Statistic | Entity | Units | Description |
| --- | --- | --- | --- |
| Avg. MSU/second transferred | M2 linkage | MSU/sec | Average MSU per second transferred by this M2 linkage during the current reporting interval |
| Peak MSU/second transferred | M2 linkage | MSU/sec | Maximum number of MSUs per second transferred in both directions by this M2 linkage for any given 1-second period during the current reporting interval |
| Avg. MSU size transferred | M2 linkage | Octet(s) | Average size of MTP2 MSUs transferred in both directions by this M2 linkage during the current reporting interval |
| Peak MSU size transferred | M2 linkage | Octet(s) | Largest size of MTP2 MSU transferred in either direction by this M2 linkage during the current reporting interval |
| Avg. cross-gateway delay | M2 linkage | Millisec. | Average delay across the gateway for MSUs transferred by the M2 linkage during the current reporting interval |
| In-service time | M2 linkage | Date/Time Stamp | Date and time that the M2 linkage last came into service |

Figure 5:
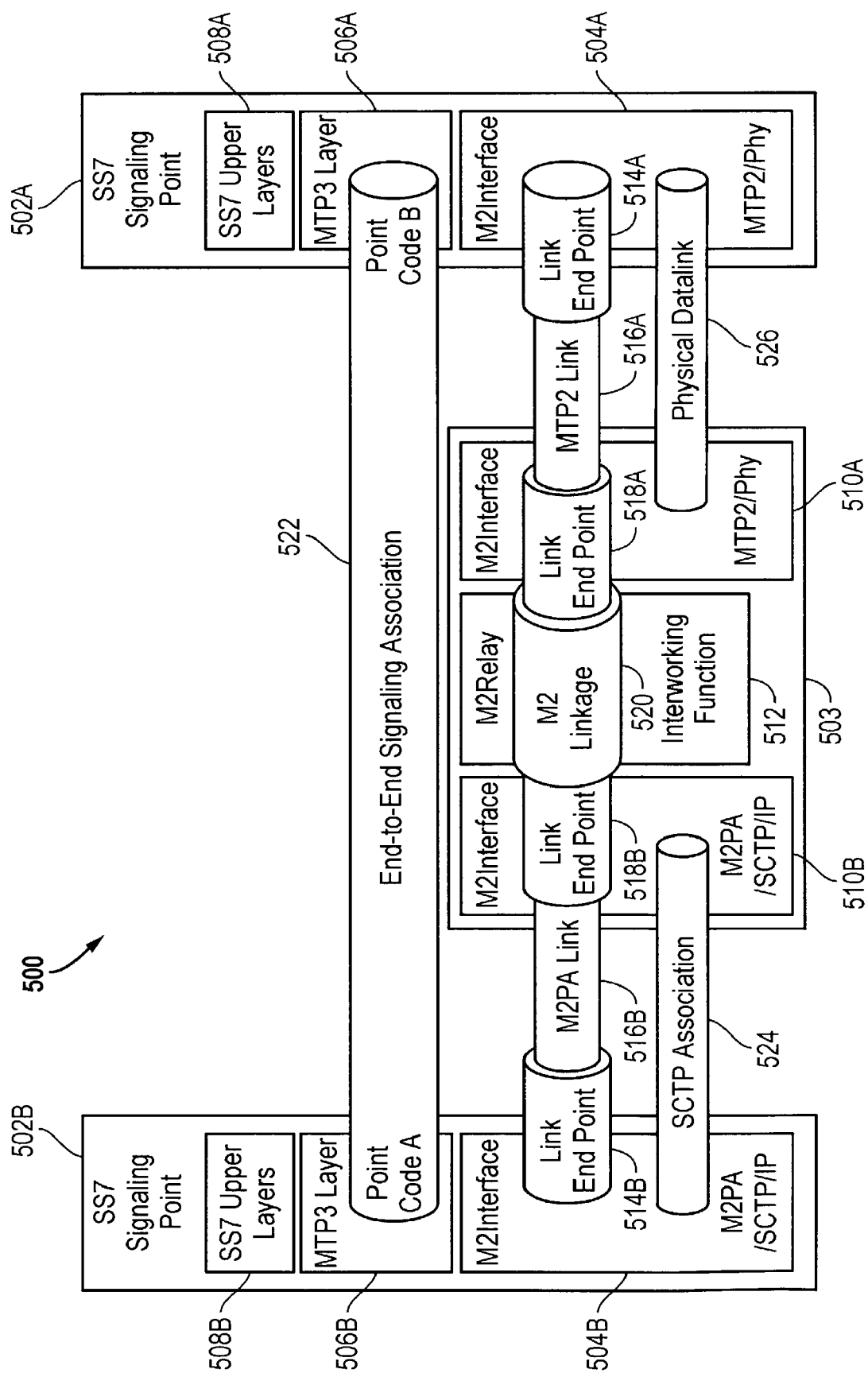
FIG. 5 depicts a high-level functional block diagram of a gateway device having the IWF of the present invention for interlinking a conventional MTP2 link and an IP-based MTP2 link.

Additional functional and structural details of the present invention's generic IWF structure will now be set forth in particular detail with exemplary reference to a mechanism for interworking a conventional SS7 link segment with an IP-based SS7 link segment. Referring to FIG. 5, depicted therein is a high-level functional block diagram of a gateway device 503 having the IWF of the present invention that is adapted for interlinking a conventional MTP2 link segment 516A and an IP-based MTP2 link segment 516B. The exemplary communications network arrangement 500 includes a conventional SS7 SP node 502A that is interconnected to an IP-based SP node 502B via the gateway device 503. SP 502A includes a lower level protocol portion 504A that includes a Level 2 interface (i.e., M2 interface) on top of a suitable physical layer. A conventional MTP3 layer 506A resides above the lower level portion 504A. In turn, the MTP3 layer 506A services the upper layers 508A of the SS7 protocol stack (e.g., Transaction Capabilities Application Part or TCAP, Signaling Connection Control Part or SCCP, or various User Parts such as ISDN User Part or ISUP, Telephony User Part or TUP, and Data User Part or DUP). In similar fashion, SP 502B includes applicable SS7 upper layers 508B which reside on top of the MTP3 layer 506B. An IP-based lower level protocol portion 504B services the MTP3 506B, which portion 504B includes an SCTP-over-IP mechanism for transmitting M2 MSUs via an adaptation layer (e.g., M2PA layer).

The M2 gateway device 503 includes an M2 interface 510A operable with the conventional SS7 link segment 516A. The link segment 516A thus spans between an SP end point 514A (supported by the lower level interface 504A of SP 502A) and a gateway end point 518A supported by the M2 interface 510A. Likewise, a second M2 interface 510B is provided for effectuating the M2PA-based link segment 516B between an SP end point 514B and a gateway end point 518B. The M2RF 512 of the gateway device 503 is operable to establish an M2 linkage 520 between the two link segment end points supported by the gateway's M2 interfaces. In the exemplary embodiment shown in FIG. 5, a datalink 526 exemplifies the physical media association between the M2 interface 510A and the corresponding interface 504A in the SP node 502A. Similarly, reference numeral 524 refers to an SCTP-based physical association between the M2 interface 510B and the corresponding interface 504B in the IP-SP node 502B.

As SS7-compliant SP nodes, nodes 502A and 502B originate and terminate MSU traffic over an end-to-end Signaling Association 522 established over their respective MTP3 layers. The MTP3 layer selects a Combined Link Set to carry the MSU traffic according to a Route Set assigned to the Signaling Association 522. A specific link in the selected Link Set is then selected to carry each MSU according to the SLS assigned to the MSU.

Whereas the MSU transfer process between the two SP nodes 502A and 502B is implemented to be transparently seamless from the perspective of the MTP3 layer, advanced procedures like Link Changeover, Link Recovery and Changeback, etc., may involve the functionality of the intervening gateway device 503. These procedures will be described in further detail below.

Figure 6:
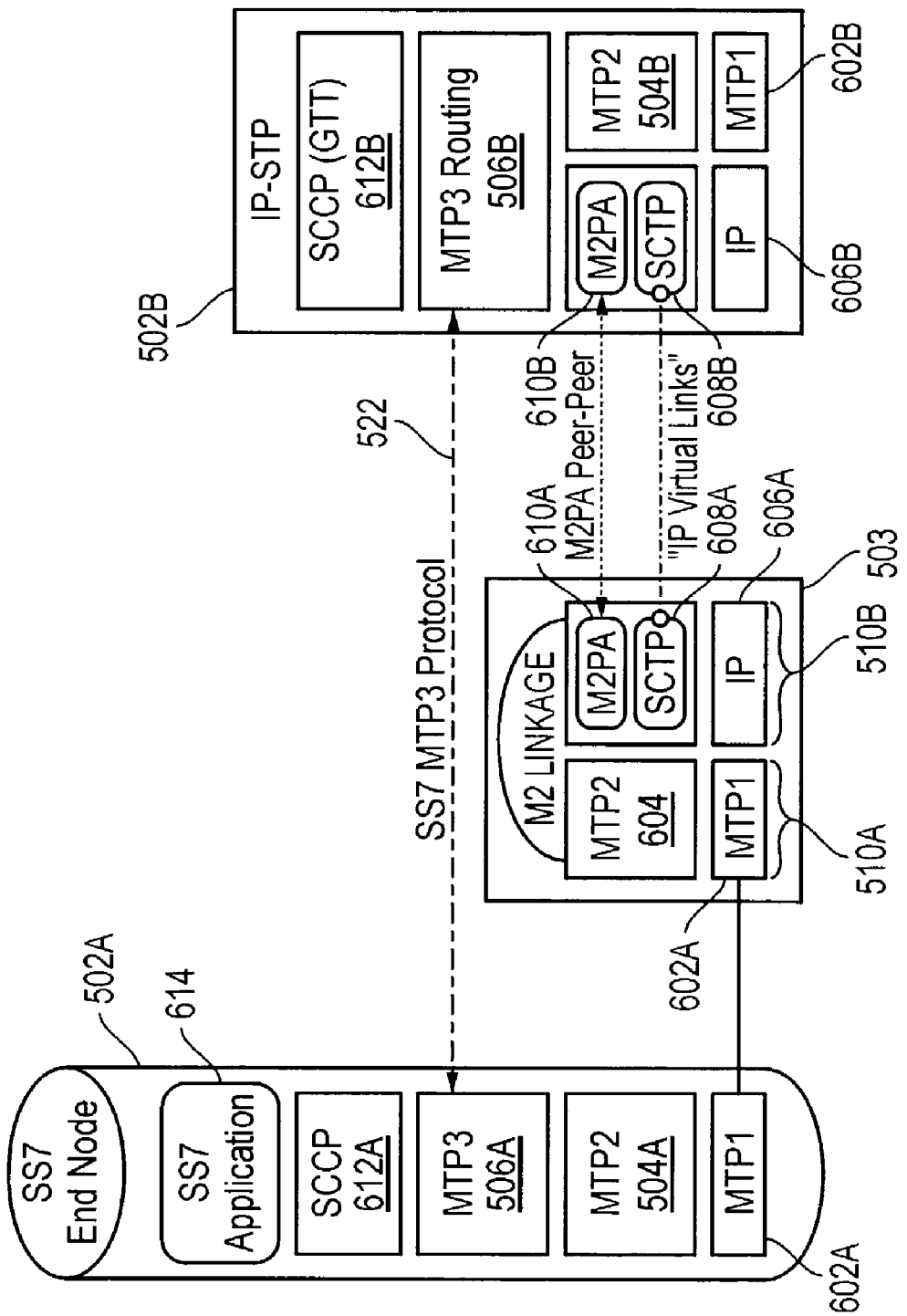
FIGS. 6 and 7 depict additional details relating to the IWF exemplified in FIG. 5.
Figure 7:
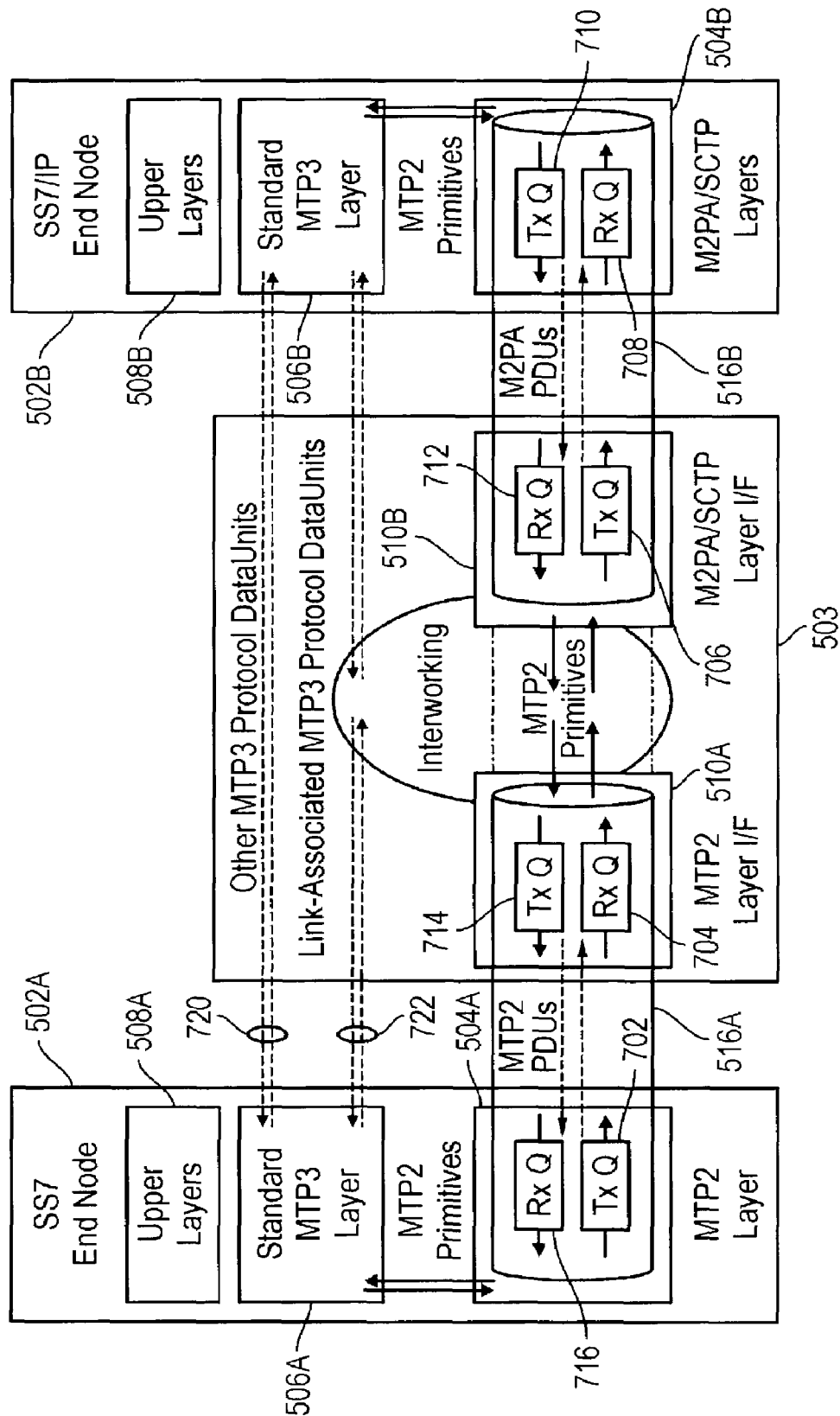

Referring now to FIGS. 6 and 7, depicted therein are additional details relating to the gateway device 503 exemplified in FIG. 5. The conventional SS7 node 502A is further exemplified with an MTP1 layer 602A and a particular upper layer, the SCCP layer 612A. An SS7 application 614 is also shown as part of the protocol stack of the node 502A.

The IP-based SS7 node 502B is exemplified as an IP-STP which also includes a particular upper layer, the SCCP layer 612B, that comprises Global Title Translation (GTT). The MTP3 layer functionality 506B, operable to establish MTP3 Signaling Association 522 with MTP3 506A, is serviced by a lower protocol stack that involves a M2PA layer 610B on top of the SCTP transport layer 608B. An IP-capable physical layer 606B is also included.

As pointed out before, M2 interface 510A of the gateway device 503 is operable to establish a link segment with SS7 node 502A. To effectuate the link segment, an MTP1 functionality 602A and an MTP2 functionality 604 are provided as part of the interface 510A. The adjoining M2 interface 510B includes IP layer 606A, SCTP layer 608A and an M2PA layer 610A, in order to effectuate a link segment with IP-STP 502B over an IP "virtual link" between the SCTP layers 606A and 606B. As described in the cross-referenced patent application "System And Method For Transporting IN/AIN Signaling Over An Internet Protocol (IP) Network," application Ser. No. 09/651,307, filed Aug. 30, 2000, the M2PA layers 610A and 610B of the gateway device 503 and IP-STP 502B, respectively, are operable to establish peer-to-peer communication for transferring MTP2 MSUs therebetween.

A queue-based architecture of the generic IWF of the present invention is exemplified in FIG. 7 for the gateway device 503. The MTP2 layer functionality 504A of SS7 end node 502A is operable to support a data transport engine having at least one transmit queue structure 702 and at least one receive queue structure 716, which are operable with respect to the exchange of data (i.e., M2 protocol data units or PDUs) via the link segment 516A. The M2IF functionality 510A of the gateway device 503 is likewise operable to support a data transport engine having at least one receive queue structure 704A and at least one transmit queue structure 714 that are operable with respect to the link segment 516A.

In similar manner, data transfer involving M2PA PDUs on the other, adjoining link segment 516B between the M2IF 510B of the gateway device 503 and the corresponding M2PA/SCTP layer functionality 504B is facilitated by appropriate buffered queue arrangements at each endpoint. Accordingly, a data transport engine supported by the M2IF 510B includes at least one transmit queue structure 706 and at least one receive queue structure 712, and a data transport engine supported by the M2PA/SCTP layer functionality 504B includes at least one receive queue structure 708 and at least one transmit queue structure 710.

As pointed out earlier, the end-to-end Signaling Association between the two end nodes facilitated by their respective MTP3 layers can involve the M2RF of the gateway device 503. Thus, whereas a link-associated MTP3 PDU pathway 722 traverses the IWF structure of the gateway for effectuating link-specific procedures, other MTP3 PDUs are transported via a pass-through path 720 established in the gateway.

A number of MTP2 primitives, including conventional standards-specific primitives as well as innovative standards-compliant primitives, are implemented in order to effectuate the overall MTP2 layer functionality within the end nodes and across the M2 interfaces of the gateway device. In particular, FIG. 8 depicts a table 800 of various message primitives supported by the M2 interfaces such that the generic IWF between two MTP2 link segments can be properly established in accordance with the teachings of the present invention. For instance, new primitives such as, e.g., M2-Rx-Congestion-Onset and M2-Rx-Congestion-Abate, are used for managing receive queue congestion in the M2 linkage of the gateway.

As will be recognized by one of ordinary skill in the art, the message primitives represent information flow between an M2 interface and its user layer which can be a peer layer or an upper layer. Whereas the various exemplary primitives are provided here as an aid toward understanding the M2IF and M2RF processing models, they are not meant to specify a particular implementation. Thus, the exemplary message primitives may take any form in actual implementation provided that the observable protocol behavior matches the requisite processing model's behavior.

In the table 800 depicted in FIG. 8, a ".req" identifier 802 represents a request from an MTP2 user to its M2 interface, an ".ind" identifier 804 represents an indication from an M2 interface to its MTP2 user, an ".rsp" identifier 806 represents a response from an MTP2 user to its M2 interface, and a ".cfm" identifier 808 represents a confirmation from an M2 interface to its MTP2 user. A Forward Sequence Number (FSN) parameter, which indicates the sequence number of transmitted MSUs in forward direction, is included in some of the message primitives so that the M2RF of the present invention is capable of checking that a remote M2IF starts its MSU numbers with 0 after link alignment and that the MSU numbers remain in sequence. As will be seen in further detail below, the integrity of FSNs is important in Link Changeover procedures to function successfully.

Referring now to FIG. 9, shown therein is a table 900 of various procedure blocks that may be implemented as part of an M2IF in order to effectuate the IWF of the present invention. Associated with link procedures, a set of linkage-related procedures will be used to establish an operable linkage between two M2IFs in a gateway device. A link creation procedure 902 is operable to create a new link segment on an M2 interface of the gateway device having the M2 relay functionality. Thereafter, upon invoking a linkage creation procedure, an M2 linkage supported by the M2RFs of the gateway device joins exactly two M2 link segments within the gateway, wherein the link segments may be of the same type as different types. Preferably, the M2 link segments joined by an M2 linkage, even if of different types, are capable of operating at the same maximum MSU transfer rates. It is the responsibility of the M2RF structure of the gateway device to negotiate the operating MSU transfer rate during the linkage creation phase.

M2 link segments may be created in a gateway device without being joined by an M2 linkage. However, such link segments will not be able to send or receive MSU traffic until joined by an M2 linkage. M2 link segments (or, "links" for short) not joined by an M2 linkage can however be tested and may also be activated, but will remain in a Local Processor Outage (LPO) state at the gateway until successfully joined by a linkage. Thus it is possible to create and activate an M2 link within a gateway without being joined by an M2 linkage. In one exemplary implementation, M2 link segments not joined via a linkage that successfully pass alignment will be placed in the LPO state by the M2RF immediately upon entering In-Service state.

In accordance with the teachings of the present invention, an M2 linkage may be created joining two existing M2 link segments, or without one or both joined link segments already existing. However, M2 link segments that do not already exist must be created at the time of M2 linkage creation. In other words, M2 linkages cannot exist in the exemplary embodiment without exactly two M2 links assigned and created. Further, M2 linkages may be created for immediate activation or later activation. Again, preferably, the M2 linkage activation state is independent of the underlying M2 link segment activation states. That is, an M2 linkage may be deactivated but one or both joined M2 link segments may be activated. However, if an M2 linkage is activated then both joined segments are also activated (if not already activated). Thus, while it is possible to create an M2 linkage with zero, one, or two link segments to be joined already created, the creation of an M2 linkage without both joined link segment already created may automatically create the missing link segment(s). Additional details relating to the inter-dependence of the linkage states and link segment states will be presented hereinbelow in reference to their respective state control models.

Preferably, M2 linkages may be created in either Activated state or in a De-activated state (for later activation). If created in the De-activated state, an M2 linkage cannot affect the Activation state of already created M2 link segments that the linkage adjoins. However, M2 linkages created in the De-activated state can cause the LPO condition to be asserted on both adjoined M2 link segments.

Similar to the link segment activation, an M2 linkage may be activated upon created or may be activated manually upon creation. Upon activation, M2 linkages automatically activate both adjoined link segments (unless already activated). During M2 linkage activation, one or both M2 link segments may already be in an In-Service state or in a complete Alignment state, and become In-Service during the activation process. M2 links that are In-Service before successful completion of the linkage activation are placed in the LPO state, however. Once both link segments are In-Service and the linkage activation process is successfully completed, then the link segments that were placed in the LPO state can exit that state.

During M2 linkage activation, the M2RF responsible for the linkage inspects the declared MSU transfer rate of both link segments it joins. In one implementation, the linkage MSU transfer rate becomes the lesser of the two declared rates of the joined link segments.

Continuing to refer to the table 900 of FIG. 9, a link deletion procedure 904 is responsible for deleting an existing M2 link segment on an M2 interface. Link activation and deactivation procedures 906, 908, described hereinabove, are operable to bring a link segment into an In-Service state or into an Out-Of-Service state, respectively, preferably in response to automatic or manual controls. As pointed out, M2 link segments may be deactivated independently of any M2 linkage that may or may not join them. M2 links that are deactivated force a Stop message to be asserted on the adjoined M2 link (if any) by their M2 linkage. An M2 linkage that is deactivated causes an LPO message to be asserted on both joined M2 links (unless one or both M2 links is/are deactivated or otherwise not In-Service).

An M2 linkage may be deleted without affecting the existence or In-Service state of its joined M2 links. M2 linkages that are deleted cause the M2RF of the gateway device to assert the LPO message on both joined links. In one exemplary embodiment, however, deletion of an M2 link currently joined by an M2 linkage first requires the deletion of the M2 linkage beforehand. Thus, an attempt to delete a jointed M2 link may result in an error indication, and the state of the linkage and the links joined thereby is not changed. On the other hand, M2 links not currently joined by an M2 linkage can be deleted at any time.

M2 linkages depend on their underlying M2 link segments to perform alignment and proving. M2 link alignment and proving can begin as soon as the link segments are activated, regardless of whether they are activated by M2 linkage activation or explicit M2 link segment activation. Typically, unless directed by Emergency indications from adjacent SP end nodes, M2 link segments undergo normal alignment and proving procedures. A link alignment procedure 910 allows link segment endpoints (each link segment having two endpoints, one in the M2IF of the gateway device and the other in the joined SS7-compliant end node) to exchange control information to synchronize the starting of a link proving procedure 912. The link segment end points exchange information during the proving procedure so as to demonstrate and validate the segment's integrity. Thus, upon proving, the link segment should be capable of performing acceptability once placed in the In-Service state.

During M2 link alignment and proving, it is the responsibility of the M2 linkage to convey the type of alignment being performed (i.e., Normal Alignment or Emergency Alignment) by one M2 link segment to its adjoined M2 link segment. Preferably, this is accomplished by transferring Remote Emergency indications to the corresponding Emergency requests of the adjoined M2 link segment. In one implementation, immediately after receiving the Remote Emergency indication from one joined M2 link segment, the M2 linkage is operable to assert the Emergency request of the other joined M2 link segment. Likewise, upon receiving the Remote Emergency Cease indication from one joined M2 link segment, the M2 linkage is operable to assert the Emergency Cease request of the other joined M2 link segment.

In one exemplary embodiment of the present invention, the M2 linkage depends upon the Alignment Error Monitoring of its joined M2 link segments. Accordingly, no separate M2 linkage procedure is performed for such purposes. However, the M2 linkage is operable to monitor for any M2 link failure conditions that might occur. In any M2 link segment fails, the associated M2 linkage also fails, i.e., its state transitions into the "Out-Of-Service Failed" state. If an M2 linkage fails for any reason, a Stop (i.e., Deactivate) message is subsequently asserted by the linkage on its joined M2 link segments (if they are in the In-Service state).

Various MSU-transfer-related procedures are provided as part of the Relay Functionality of the present invention. An MSU transmission procedure block 914 is operable to transfer MSUs from a local link user to adjoined remote link user without error and in sequence relative to other MSUs on the link. Likewise, an MSU reception procedure block 916 is operable to guarantee that MSUs received from the remote link user are delivered to the local link user without error and in sequence relative to other MSUs on the link segment. Preferably, MSUs received on an M2 link segment are transferred immediately to the adjoining M2 link segment by the M2 linkage if it is In-service, by asserting its M2-Transmit request primitive. MSUs received on a link segment that is adjoined via an M2 linkage not in service (because, e.g., it is deactivated or its adjoining link segment has failed or is deactivated for some reason) are discarded by the M2 linkage. In similar fashion, MSUs received on an M2 link that is not adjoined via an M2 linkage are discarded by the M2RF structure of the gateway device.

An error monitoring block 918 is operable to monitor the ability of the link segments adjoined via a direct linkage to transfer MSUs acceptably between the endpoints. If any conditions develop that compromise the MSU transferability, the error monitoring block can initiate a link deactivation procedure. Whereas most MSUs may be transferred via the M2RF with no special processing by the M2 linkage coupling the two adjoined link segments, certain higher-level protocol requirements give rise to the need to capture the Originating Point Code (OPC) and Signaling Link Code (SLC) of the adjacent SP end node for each link segment into a configuration database maintained by the gateway device. Preferably, this is accomplished by inspecting MSUs transferred on each newly activated M2 linkage until the necessary information is discovered.

For M2 link segments for which the OPC is unknown, MSUs are inspected for one of the types known to carry the OPC of the adjacent SP (e.g., Signaling Link Test Message or SLTM, et cetera). When one of these MSUs is detected, the OPC from that MSU is extracted and placed in the M2 link configuration database. Once discovered, OPC checking can cease or continue as an implementation-dependent option. Likewise, MSUs may be may be inspected for M2 link segments for which the SLC is unknown.

Still continuing to refer to FIG. 9, various link/linkage congestion handling procedures are also provided as part of the M2 relay functionality of the present invention. The M2RF and linkage functions are preferably designed so that the structures responsible for these functions themselves cannot congest. That is, the M2RF and linkage structures may not have separate MSU queues apart from that of M2 link transmit and receive queues that can get congested. However, it is possible for the M2 links adjoined via an M2 linkage to congest requiring the M2 linkage to take action. A transmit congestion handling block 920 is operable to detect and notify link user of congestion conditions at the local link transmitter. Similarly, a receive congestion handling block 922 is provided for detecting and notifying a remote endpoint of congestion conditions at the local link receiver.

Preferably, congestion detection by M2 link segments is provided to be implementation-dependent. Whereas M2 link segments joined to M2 linkages may be required to perform their normal receive congestion detection handling, they may also be required to provide a method by which the M2 linkage may force receive congestion on an afflicted M2 link segment. In one exemplary implementation, the M2 linkage simply stops taking MSUs received on the M2 link segment. In another implementation, the M2 link segment may provide an explicit primitive to trigger receive congestion. At a minimum, each M2 link segment joined by an M2 linkage is capable of supporting a mechanism by which the M2 linkage can invoke Receive Congestion Onset and Receive Congestion Abate messages on the M2 link segment. It should be noted, however, that the Receive Congestion Abate message asserted by the M2 linkage need not necessarily end the Receive Congestion state since the M2 link segment's own detection mechanism may still be needed to detect Receive Congestion independently.

Additionally, Receive Congestion detected by an M2 link segment assigned to an M2 linkage can be handled by the link segment in a type-specific manner. In other words, the handling of Receive Congestion by a link segment can be generic enough to support the various link types described earlier, as the M2 linkage is preferably provided to be de-coupled from the link segment's congestion handling.

With respect to transmit queue structures, if a Transmit Congestion condition is detected at the M2 linkage end of an M2 link segment, the congestion is signaled to its adjoined M2 linkage by means of the M2 Transmit Congestion Onset and M2 Transmit Congest Abate primitives. Assertion of a Transmit Congestion Onset primitive can trigger immediate Receive Congestion Onset by the M2 linkage on the adjoined M2 link segment. Likewise, Transmission Congestion Abate can trigger immediate Receive Congestion Abate in the M2 link segment. Thus, on the whole, the M2RF is preferably provided with an oversight congestion handler that can throttle both receive traffic as well as transmit traffic on the coupled M2 link segments as necessary.

A mechanism for handling processor outage (PO) is also provided as part of the M2RF structure of the present invention. A processor outage block 924 is responsible for rapidly transferring a Local Processor Outage or LPO condition at one link user to its adjoined remote link user so that message loss is minimized. An M2 linkage can assert LPO on its adjoined M2 link segments for a number of reasons, some of which were discussed previously, e.g., (i) the link segments are activated but the linkage is deactivated and (ii) the linkage and link segments are activated, but one or both M2 links have not yet come into the In-Service state. In addition, the M2 linkage can assert LPO where it and the adjoined link segments are In-Service, but a Remote Processor Outage (RPO) condition is received on one of the link segments.

Likewise, an M2 linkage can assert Local Processor Recovered (LPR) on its adjoined link segments for any of the following reasons: (i) both link segments are In-Service and the linkage is activated, (ii) one link segment is In-Service, its associated M2 linkage is activated, and the second link segment comes In-Service, or (iii) the link segments and associated linkage are In-Service, and a Remote Processor Recovered (RPR) condition is received on one of the link segments.

If an RPO condition is received at the M2 linkage end of an M2 link segment, this condition can be immediately signaled to its adjoined link segment (if any). The M2 linkage can then immediately assert an LPO condition on the other adjoined link segment. If an M2 linkage asserts LPO on one or both M2 links, it may continue to transfer MSUs received, if possible, between the adjoined M2 links. This allows "in-flight" MSUs to be delivered to the adjacent SP end nodes in spite of the processor outage condition. If an RPR condition is received at the M2 linkage end of an M2 link segment, this condition may also be immediately signaled to its adjoined link segment (if any). Thereafter, the M2 linkage may assert LPR on the adjoined link segment.

Figure 10:
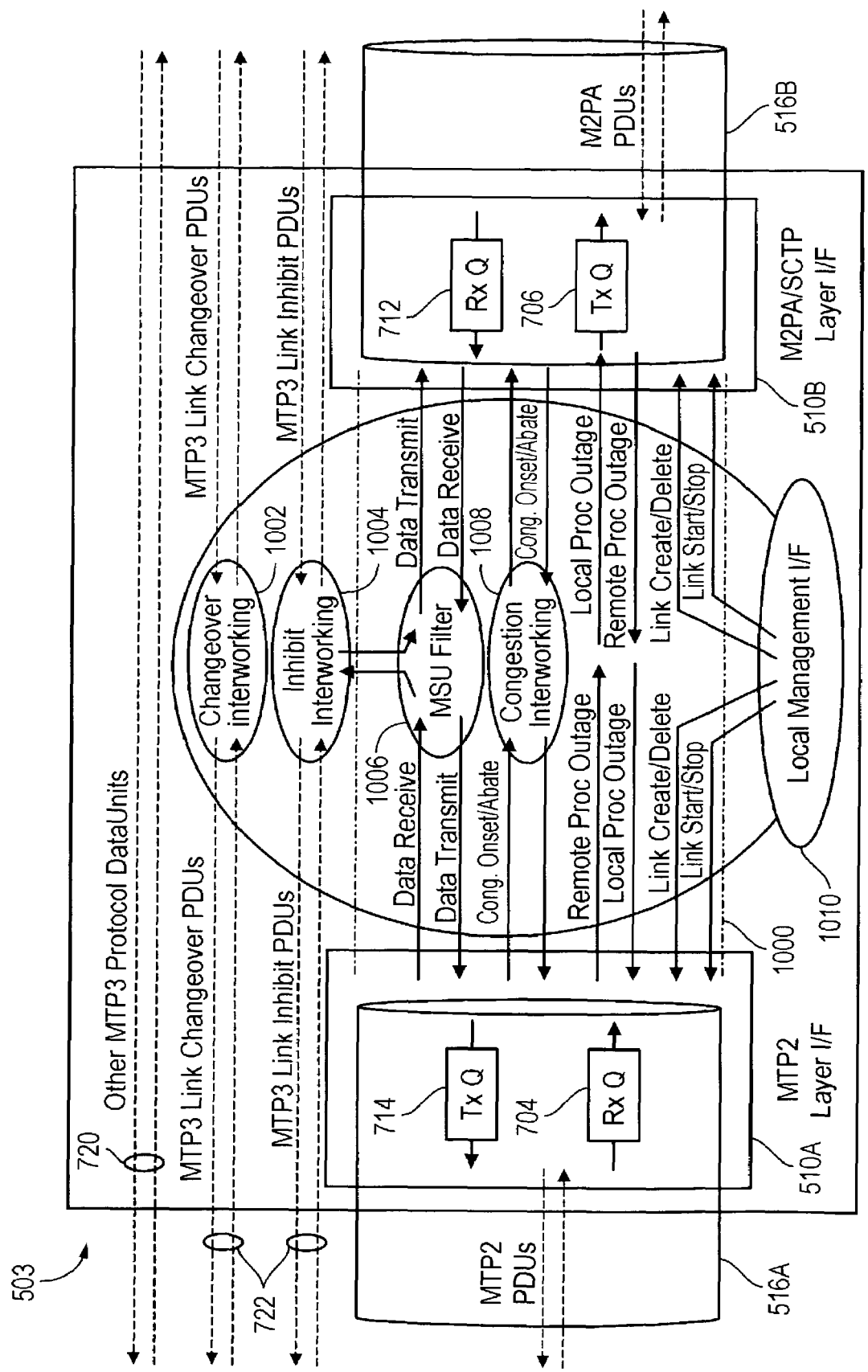
FIG. 10 depicts the overall functionality of a relay linkage between a conventional MTP2 link and an IP-based MTP2 link.

Referring now to FIG. 10, depicted therein is the overall functionality of a direct linkage 1000 established by the M2RF of the gateway device 503 using the various procedural blocks described in detail hereinabove. A local management interface 1010, which in one embodiment may comprise the interfaces 405, 407 and 409 depicted in FIG. 4, is provided for operation in connection with the link creation/deletion, activation/deactivation procedure blocks. A link changeover interworking module 1002 is operable to process MTP3 link changeover PDUs received via pathway 722. Likewise, a link inhibit interworking module 1004 is operable to process MTP3 link inhibit PDUs on the pathway 722. As mentioned earlier, other MTP3 PDUs traverse the gateway via the pass-through pathway 720, as they require no special processing. An MSU filter 1006 is operable with the MTP2 PDUs transported across the direct linkage mechanism between the two M2 interfaces 510A and 510B. By way of example, a Data Receive process is responsible for receiving data into the filter 1006 from the M2IF 510A and a corresponding Data Transmit process is responsible for transporting the data to the M2IF 510B. A pair of Data Receive/Transport processes are also provided for transporting data in the opposite direction. As pointed out above, applicable data transfer rates (i.e., bandwidth) are negotiated or set up at the time of link segment configuration. Essentially, an overall bandwidth manager associated with the M2RF is operable to monitor the allocation of the bandwidth across the various linkages and links supported by the M2RF. The total transfer rate of the RF is simply a composite of the bandwidth assigned to or consumed by each M2 linkage, which in turn is dependent on link type and whether the links have hard-coded bandwidth requirements or configurable requirements. Ultimately, the bandwidth manager is operable to allocate and manage the total transfer rate of the M2RF by managing the individual linkages.

Further, the MSU filter 1006 cooperates with the link inhibit interworking module 1004 when necessary. A congestion interworking module 1008 is operable, responsive to the Congestion Onset/Abate primitives generated by the M2 interfaces, to implement the congestion handling procedures described hereinbefore. Likewise, LPO and RPO conditions are transmitted by the direct linkage 1000 between the interfaces.

Proper functioning of link changeover on a failed link segment or the direct linkage responsible therefor depends on well-behaved FSNs on both the link segments joined by the linkage structure. Specifically, FSN for the first MSU received on a newly In-Service link segment must begin with 0 and increase by exactly 1 for each MSU received. Thereafter, the FSNs need to wrap around to 0 again after the last MSU with the maximum FSN carried by the link segment type has been received.

Accordingly, the linkage structure 1000 includes means for checking for well-behaved FSN values on each M2 link segment joined. In one implementation, means are provided to detect "wrap-around to zero" condition and determine that previous FSN value is a power of 2 minus 1. In another implementation, means are provided to determine the expected bit-length of FSN based on the M2IF type and then determine FSN's wrap around after the value $\{2^{[bit-length]}-1\}$ is reached. Further, if the FSNs are not well-behaved, means are included in the linkage structure to post an alarm to the alarm interface portion of the local management interface 1010.

It will be recognized that failure of a Signaling Link between the two SP end nodes, which Link involves two M2 link segments coupled by the direct linkage function of the present invention, is operable to invoke a Link Changeover procedure, provided enough active Link Set capacity remains after the failure. In a standard-based implementation, the SP nodes immediately cease transmitting MSUs over the failed link and initiate a Buffer Updating procedure. Well-known MTP3 Changeover and Changeover Acknowledge messages are exchanged between the respective SP nodes containing the FSN of the last successfully received MSU by the respective MTP3 layers. This information is used to discard MSUs in the local Retransmit buffers of the failed link that have been transmitted and accepted by the adjoining remote SP node but were not successfully acknowledged. Finally, MSUs retrieved from the local Retransmit and Transmit buffers are redistributed over the new active link in the Link Set.

Because of the insertion of a gateway having the Relay Functionality of the present invention, the Link Changeover procedure may be affected due to such effects as FSN skew, FSN bit-length variance, gateway-specific MSU transmit queue arrangement, and the like. As pointed out in the foregoing, the standard Link Changeover procedure typically relies upon a common understanding between the two SP nodes of the FSN value assigned to each MSU. Usually this is not an issue for an MSU carried over a regular MTP2 link since the FSN is never changed midstream. However, for an MSU that traverses an M2 gateway, the MSU is received by one M2 link segment and the FSN is reformed by the adjoining M2IF's transmitter. Accordingly, the link changeover interworking module 1002 of the linkage 1000 is provided with capability to keep the FSN from drifting between two adjoined M2 link segments. FSN values assigned by the SP nodes' M2 interfaces as well as by the gateway's M2 interfaces are expected to follow the requirements of well-behaved FSN values. MSUs received in the gateway's linkage are checked to ensure that the adjoined SP nodes also follow the FSN rules so as to avoid discrepancies.

The Changeover Order (COO) and Changeover Ack (COA) messages that carry last-accepted FSN values to the adjacent SP nodes are usually provided with the same FSN bit-length as the FSN of the last MSU that traversed on the failed link. Where High-Speed Links are implemented, they require a longer FSN bit-length (in Extended Changeover Order (XCO) and Extended Changeover Ack (XCA) messages). Thus, FSN bit-length variance becomes an issue when a gateway is interfaced with standard High-Speed Links as well as legacy links. Accordingly, SP nodes coupled via the M2 gateway of the present invention may need to provide the option of using either COO/COA or XCO/XCA messages on the their Link Sets, regardless of the link type. Choice of COO/COA or XCO/XCA can be made by the gateway depending on the type of the Changeover messaging understood by the adjacent SP node.

Since MTP3 messages provide protection against message loss and duplication for the buffers in the SP nodes only, they are not effective with respect to the buffers in the gateway itself. In one embodiment of the present invention, the following solution may be implemented. An MSU with FSN=X is sent by an end node and is received successfully by the M2 gateway coupled thereto. The M2 link segment returns an Acknowledge message to the sending end node's M2 link transmitter and the MSU is removed from its Retransmit queue. Meanwhile, the M2RF structure of the gateway puts the MSU on the outgoing M2 link segment transmit queue (e.g., queue 706 in FIG. 10). If the outgoing link segment fails at this point, the failure is detected by the upstream end node (i.e., the adjoining remote end node) and it can send a COO indicating that the last MSU it received was with FSN=X−1. By buffering the MSUs in the gateway, MSU with FSN=X can be re-transmitted, although the sending end node no longer has a copy.

Figure 11:
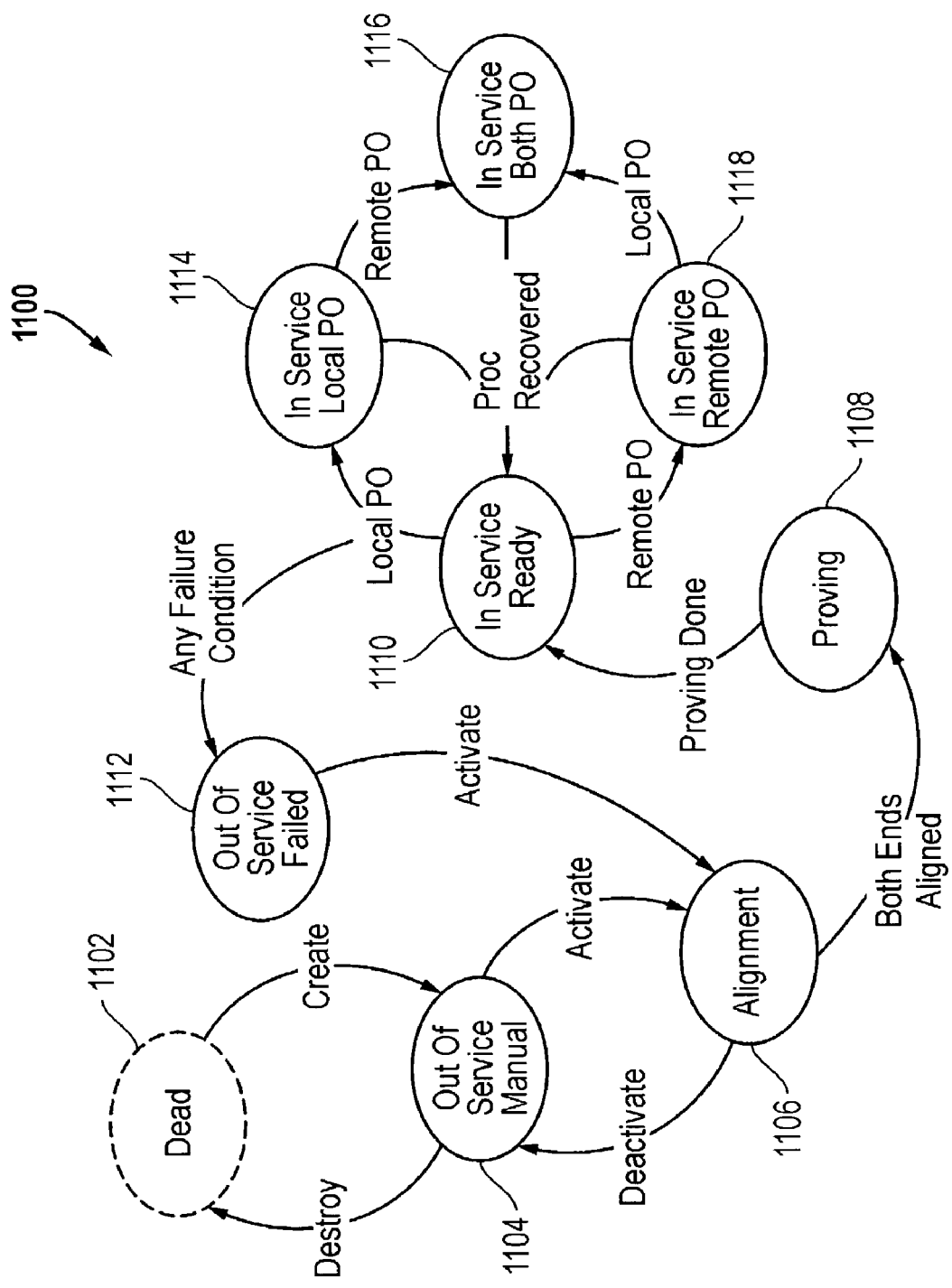
FIGS. 11 and 12 depict state transition diagrams relating to link segment and linkage establishment in accordance with the teachings of the present invention.
Figure 12:
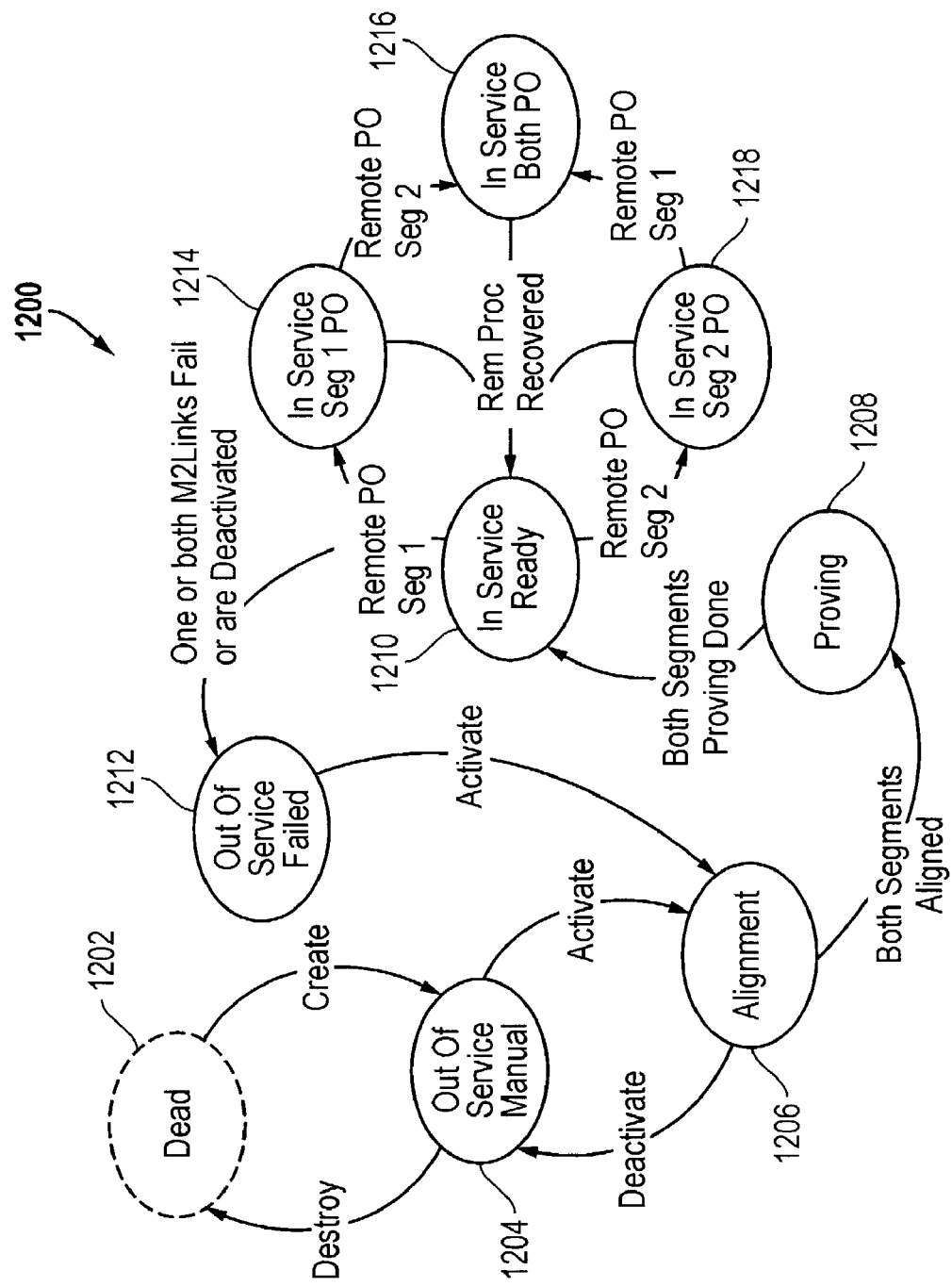

Referring now to FIGS. 11 and 12, depicted therein are state transition diagrams illustrating additional details with respect to link and linkage establishment in accordance with the teachings of the present invention. Whereas the diagram shown in FIG. 11 relates to a state control model for link segment establishment, FIG. 12 depicts a state control model of the linkage structure responsible for the link segment. As will be recognized by one of ordinary skill upon having reference hereto, both state control models operate in concert for the proper functioning of link segments between two interfaces as seen from the M2RF's viewpoint.

The behavior of each M2 link endpoint of the gateway (i.e., M2IF) is governed by a link state control model 1100. State 1102 refers to a condition where no link segment has been established yet. Upon link creation, a link segment a predetermined type goes into an Out of Service state 1104. It can exist in that state indefinitely, or can be activated based on an explicit trigger which may be automatic or manual. For instance, activation can be triggered by a state transition in the associated linkage's control model. Also, creation and activation can be effectuated simultaneously. Thereafter, upon activation, the link endpoint goes into an Alignment state 1106, which has been described in detail previously. When two M2 link endpoints have been aligned, a Proving state 1108 follows, whereupon the link segment therebetween is established. The segment is therefore put into an In-Service state 1110 and is ready for traffic. As explained earlier, when processor outage is encountered, a recovery process is initiated, whether it is an LPO or RPO condition. Typically, which ever entity initiates a PO condition, the same entity will also be responsible for processor recovery. States 1114, 1116 and 1118 depict the various transitions relating to the LPO and RPO conditions. When a failure is encountered, the segment's endpoint may transition into an "Out of Service, Failed" state 1112. The segment can then be activated again into Alignment state 1106, or it can remain there indefinitely.

The behavior of a linkage function established as part of the M2RF of the present invention is controlled by a linkage state control model 1200. Similar to the link segment's model 1100, a linkage can be created and activated, deactivated, and the like. States 1202 and 1204 relate to these transitions. Also, the linkage can be activated manually or automatically, via a local management interface, or through a remote management/administration node. An Alignment state 1206 is followed by a Proving state 1208 after both link segments coupled via the linkage are also aligned. When proving is successfully accomplished for both segments, the linkage is put into an In-Service state 1210, whereby traffic can be carried over the established direct linkage between the two link segments. In one embodiment of the model, an LPO condition is asserted on the first link segment to complete proving, which is then removed when both segments successfully complete proving. States 1214 and 1218 refer to the condition where a processor associated with link segment 1 or link segment 2 is out. State 1216 refers to the condition where both segment 1 processor and segment 2 processor are out. When one or both link segments fail or are deactivated, the linkage enters into an "Out Of State, Failed" state 1212. Relating back to the link endpoint state control model, if the linkage fails for some reason, both link segments are deactivated also.

Figure 13:
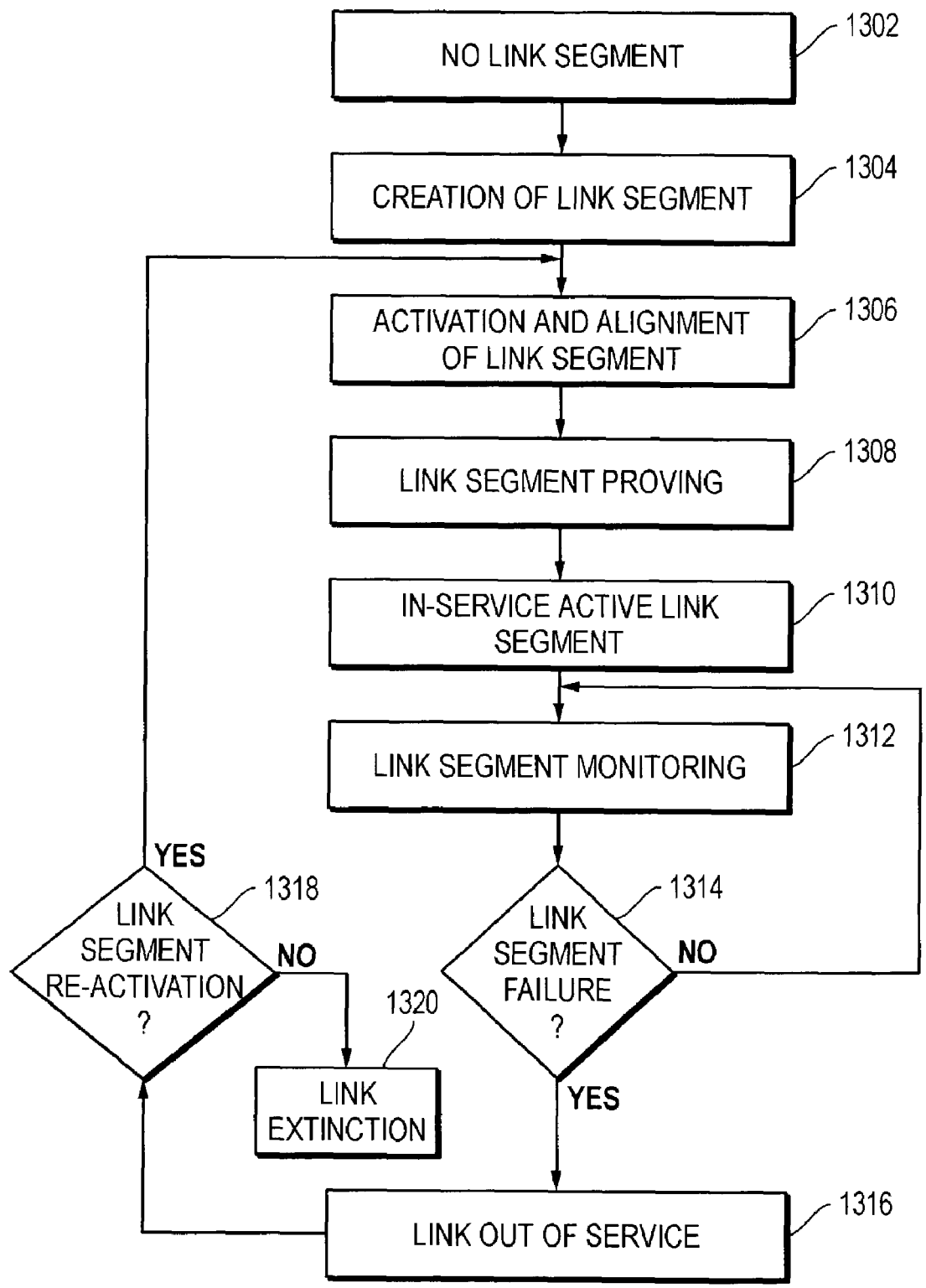
FIGS. 13 and 14 depict two flow charts of the various operations involved in an embodiment of the link segment and linkage establishment methodology of the present invention.
Figure 14:
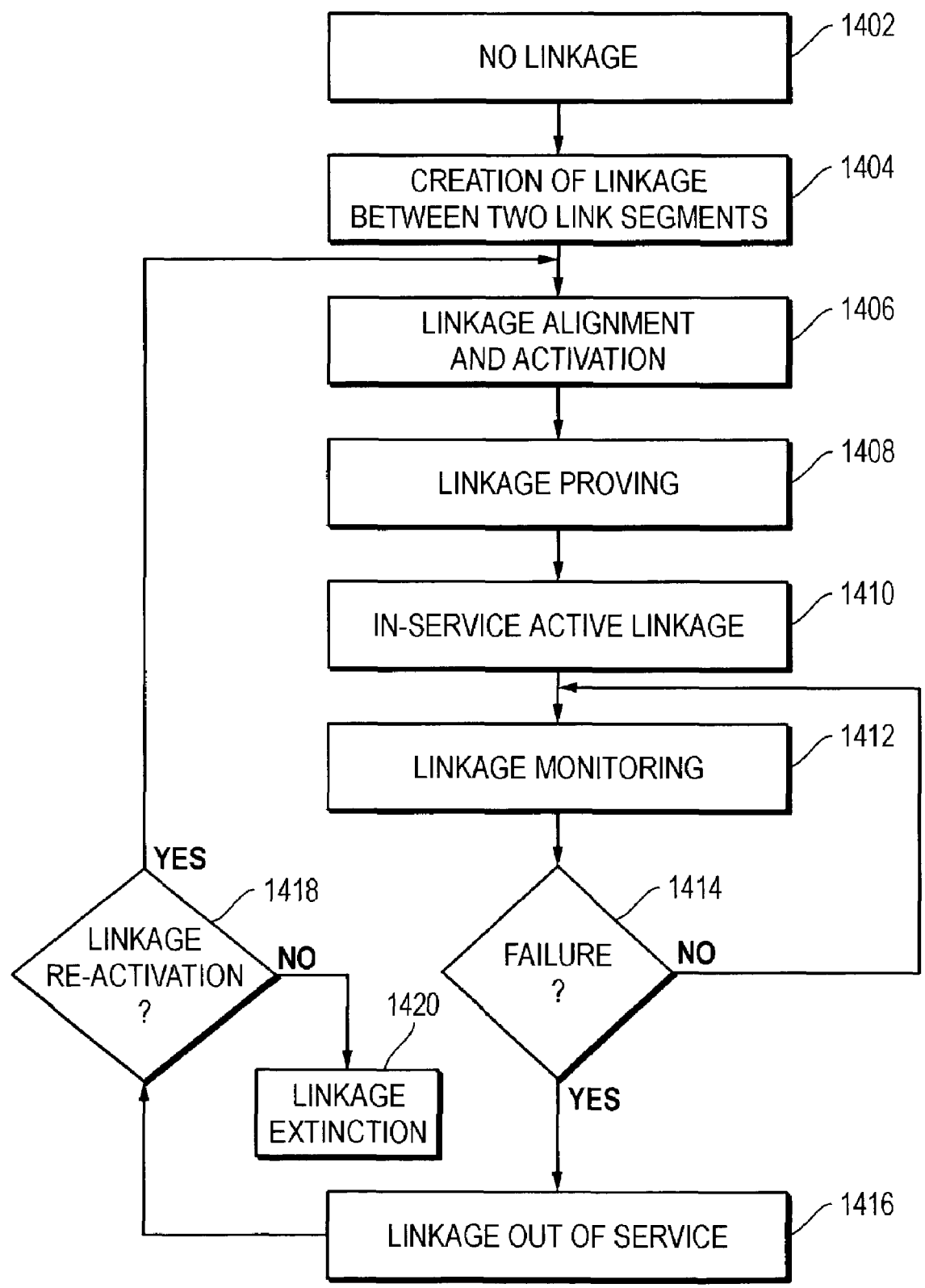

FIGS. 13 and 14 depict two flow charts of the various operations involved in link segment and linkage establishment in accordance with one embodiment of the present invention. Block 1302 refers to the condition where a new link segment is yet to be established, corresponding to state 1102 of the state control model 1100 described above. In blocks 1304 and 1306, a link segment is created, activated and aligned. Upon proving the link segment (block 1308), an active In-Service link segment is established (block 1310). In block 1312, the link segment may thereafter be monitored for integrity, alarm/failure conditions, and the like, after it is adjoined with another active In-Service link segment (which can be of any type) through a properly established linkage.

If the link segment fails for any reason (decision block 1314), the link is taken out of service (block 1316). A determination is made thereafter as to whether the link segment needs to be re-activated (decision block 1318). If not, the link segment is then extinguished (block 1320).

Referring now in particular to FIG. 14, block 1402 refers to the condition where no linkage between two link segments has been established in a gateway. In blocks 1404 and 1406, a linkage is created, activated, and aligned. Once both link segments coupled by the linkage complete proving, thereby proving the linkage as well (block 1408), an active, In-Service linkage is established for service (block 1410). Similar to the link segment behavioral model, the established linkage is monitored for any alarms, failures, et cetera (block 1412). Upon encountering a failure condition (decision block 1414), the linkage is taken out of service (block 1416). Thereafter, it may be re-activated (decision block 1418) or extinguished (block 1420).

Figure 15:
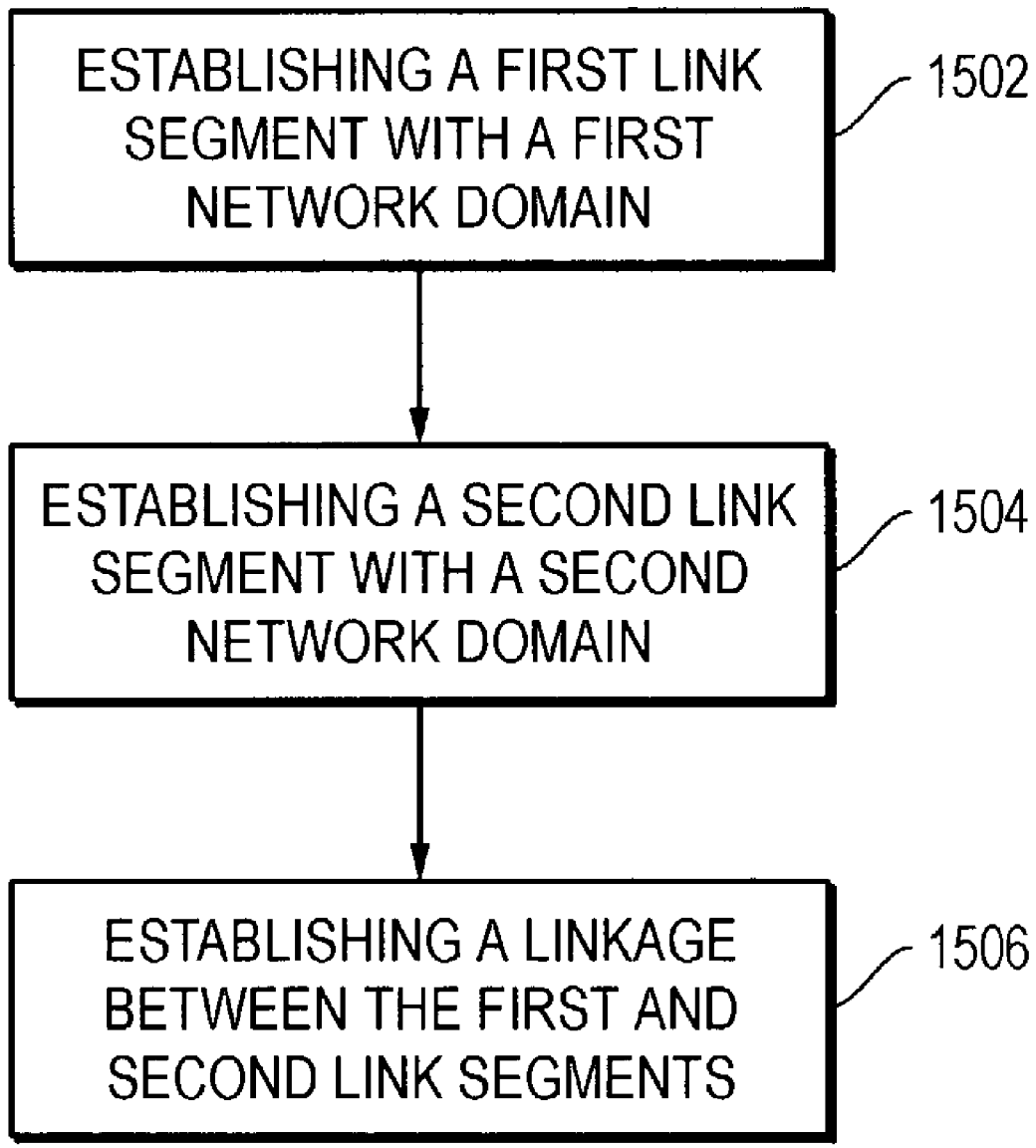
FIG. 15 depicts a flow chart of the operations of an exemplary interworking methodology of the present invention.

FIG. 15 depicts a high-level functional flow chart of the processes involved in coupling two SS7 end nodes via a gateway of the present invention. In block 1502, a first link segment is established between the gateway and an end node disposed in a first network domain. A second link segment is established between the gateway and a second end node disposed in a second network domain (step 1504). Thereafter, a direct, relay-based linkage is established between the two link segments, which may be of any type, for transporting MTP data between the two end nodes.

Based on the foregoing, it should be appreciated that the present invention advantageously provides a peer-to-peer relay adaptation solution for facilitating the transport of MTP messages across different link types without resorting to higher level functionalities. The resultant solution is a generic relay adaptation mechanism that is simpler to implement while being capable of adjoining diverse links.

It is believed that the operation and construction of the present invention will be apparent from the foregoing Detailed Description. While the apparatus and method shown and described have been characterized as being preferred, it should be readily understood that various changes, modifications and enhancements could be made therein without departing from the scope of the present invention as set forth in the following claims.

What is claimed is:

1. A communications network arrangement, comprising:
a first network domain operating to carry Signaling System No. 7 (SS7) traffic in a first type;
a second network domain operating to carry SS7 traffic in a second type; and a gateway disposed between a link segment of said first network domain and a link segment of said second network domain, said gateway operating to effectuate a linkage structure therebetween using Level-2 Message Transfer Part (MTP2) of said SS7 traffic on said link segments, wherein said step to effectuate a linkage structure includes negotiating a Message Signal Unit (MSU) transfer rate between a first interface operable in association with said link segment of said first network domain and a second interface operable in association with said link segment of said second network domain.

2. The communications network arrangement as set forth in claim 1, wherein said first network domain is operable with a protocol selected from the group consisting of: DS0, RS232, RS449, V.35, T1, E1, J1 and Ethernet protocol.

3. The communications network arrangement as set forth in claim 1, wherein said first network domain is a packet-switched network domain.

4. The communications network arrangement as set forth in claim 3, wherein said packet-switched network domain is operable to transport said SS7 traffic using Stream Control Transmission Protocol (SCTP).

5. The communications network arrangement as set forth in claim 1, wherein said second network domain is operable with a protocol selected from the group consisting of: DS0, RS232, RS449, V.35, T1, E1, J1 and Ethernet protocol.

6. The communications network arrangement as set forth in claim 1, wherein said second network domain is a packet-switched network domain.

7. The communications network arrangement as set forth in claim 6, wherein said packet-switched network domain is operable to transport said SS7 traffic using Stream Control Transmission Protocol (SCTP).

8. The communications network arrangement as set forth in claim 1, wherein said gateway includes a first interface operable in association with said link segment of said first network domain and a second interface operable in association with said link segment of said second network domain.

9. The communications network arrangement as set forth in claim 8, wherein said gateway further includes a local management interface operable to effectuate management control with respect to said linkage structure.

10. The communications network arrangement as set forth in claim 9, wherein said local management interface comprises an ASCII-based text command line interface.

11. The communications network arrangement as set forth in claim 9, wherein said local management interface comprises a Simple Network Management Protocol (SNMP)-based interface.

12. The communications network arrangement as set forth in claim 9, wherein said local management interface comprises a Man-Machine Language (MML)-based interface.

13. The communications network arrangement as set forth in claim 9, wherein said local management interface comprises a Common Management Interface/Service Element (CMISE)-based interface.

14. The communications network arrangement as set forth in claim 9, wherein said local management interface comprises a Common Object Request Broker Architecture (CORBA)-based interface.

15. The communications network arrangement as set forth in claim 9, wherein said gateway includes means for configuring said linkage structure via said local management interface.

16. The communications network arrangement as set forth in claim 9, wherein said gateway includes means for creating said linkage structure between said link segments.

17. The communications network arrangement as set forth in claim 9, wherein said gateway includes means for configuring said link segment of said first network domain created on said first interface.

18. The communications network arrangement as set forth in claim 9, wherein said gateway includes means for configuring said link segment of said second network domain created on said second interface.

19. The communications network arrangement as set forth in claim 9, wherein said gateway includes means for aligning said link segments.

20. The communications network arrangement as set forth in claim 9, wherein said linkage structure includes congestion management means for managing traffic congestion on said link segments.

21. The communications network arrangement as set forth in claim 9, wherein said linkage structure includes means of managing transfer rate between said first and second interfaces.

22. A method for interconnecting two network domains operating to carry Signaling System No. 7 (SS7) traffic of different types, comprising the steps:
establishing a first link segment with a first network domain operating to carry SS7 traffic in a first type;
establishing a second link segment with a second network domain operating to carry SS7 traffic in a second type; and
establishing a linkage structure using Level-2 Message Transfer Part (MTP2) of said SS7 traffic between said first and second link segments, wherein said step of establishing said linkage structure further includes negotiating a Message Signal Unit (MSU) transfer rate between a first interface operable in association with said first link segment and a second interface operable in association with said second link segment.

23. The method for interconnecting two network domains as set forth in claim 22, wherein said step of establishing said first link segment includes: creating a link segment, configuring said link segment, activating said link segment, and aligning and proving said link segment.

24. The method for interconnecting two network domains as set forth in claim 22, wherein said step of establishing said second link segment includes: creating a link segment, configuring said link segment, activating said link segment, and aligning and proving said link segment.

25. The method for interconnecting two network domains as set forth in claim 22, wherein said step of establishing said linkage structure includes: creating a linkage structure between said first and second link segments, configuring said linkage structure, activating said linkage structure, and aligning and proving said linkage structure.

26. The method for interconnecting two network domains as set forth in claim 22, further comprising the step of monitoring said first link segment.

27. The method for interconnecting two network domains as set forth in claim 26, further comprising the step of re-activating said first link segment when said first link segment enters a failed state.

28. The method for interconnecting two network domains as set forth in claim 26, further comprising the step of deactivating said first link segment.

29. The method for interconnecting two network domains as set forth in claim 22, further comprising the step of monitoring said second link segment.

30. The method for interconnecting two network domains as set forth in claim 29, further comprising the step of re-activating said second link segment when said second link segment enters a failed state.

31. The method for interconnecting two network domains as set forth in claim 29, further comprising the step of deactivating said second link segment.

32. The method for interconnecting two network domains as set forth in claim 22, further comprising the step of monitoring said linkage structure established between said first and second link segments.

33. The method for interconnecting two network domains as set forth in claim 32, further comprising the step of re-activating said second linkage structure when said second linkage enters a filed state.

34. The method for interconnecting two network domains as set forth in claim 32, further comprising the step of deactivating said second linkage structure.

35. The method for interconnecting two network domains as set forth in claim 22, wherein said first link segment is established using a first interface operable with a protocol selected from the group consisting of: DS0, RS232, RS449, V.35, T1, E1, J1 and Ethernet protocol.

36. The method for interconnecting two network domains as set forth in claim 22, wherein said second link segment is established using a second interface operable with a protocol selected from the group consisting of: DS0, RS232, RS449, V.35, T1, E1, J1 and Ethernet protocol.

37. A gateway device for interconnecting two network domains operating to carry Signaling System No. 7 (SS7) traffic of different types, comprising:
  means for establishing a first link segment with a first network domain operating to carry SS7 traffic in a first type;
  means for establishing a second link segment with a second network domain operating to carry SS7 traffic in a second type; and
  means for establishing a linkage structure using Level-2 Message Transfer Part (MTP2) of said SS7 traffic between said first and second link segments, wherein said means for establishing said linkage structure further includes means for negotiating a Message Signal Unit (MSU) transfer rate between a first interface operable in association with said first link segment and a second interface operable in association with said second link segment.

38. The gateway device for interconnecting two network domains as set forth in claim 37, wherein said means for establishing said first link segment includes: means for creating a link segment, means for configuring said link segment, means for activating said link segment, and means for aligning and proving said link segment.

39. The gateway device for interconnecting two network domains as set forth in claim 37, wherein said means for establishing said second link segment includes: means for creating a link segment, means for configuring said link segment, means for activating said link segment, and means for aligning and proving said link segment.

40. The gateway device for interconnecting two network domains as set forth in claim 37, wherein said means for establishing said linkage structure includes: means for creating a linkage structure between said first and second link segments, means for configuring said linkage structure, means for activating said linkage structure, and means for aligning and proving said linkage structure.

41. The gateway device for interconnecting two network domains as set forth in claim 37, further comprising means for monitoring said first link segment.

42. The gateway device for interconnecting two network domains as set forth in claim 41, further comprising means for re-activating said first link segment when said first link segment enters a failed state.

43. The gateway device for interconnecting two network domains as set forth in claim 41, further comprising means for deactivating said first link segment.

44. The gateway device for interconnecting two network domains as set forth in claim 37, further comprising means for monitoring said second link segment.

45. The gateway device for interconnecting two network domains as set forth in claim 44, further comprising means for re-activating said second link segment when said second link segment enters a failed state.

46. The gateway device for interconnecting two network domains as set forth in claim 44, further comprising means for deactivating said second link segment.

47. The gateway device for interconnecting two network domains as set forth in claim 37, further comprising means for monitoring said linkage structure established between said first and second link segments.

48. The gateway device for interconnecting two network domains as set forth in claim 47, further comprising means for re-activating said second linkage structure when said second linkage enters a failed state.

49. The gateway device for interconnecting two network domains as set forth in claim 47, further comprising the step of deactivating said second linkage structure.

50. The gateway device for interconnecting two network domains as set forth in claim 37, wherein said first link segment is established using a first interface operable with a protocol selected from the group consisting of: DS0, RS232, RS449, V.35, T1, E1, J1 and Ethernet protocol.

51. The gateway device for interconnecting two network domains as set forth in claim 37, wherein said second link segment is established using a second interface operable with a protocol selected from the group consisting of: DS0, RS232, RS449, V.35, T1, E1, J1 and Ethernet protocol.

52. A computer readable medium encoded with computer executable instructions thereon, said medium for operating in association with a management control interface provided in a gateway device that is disposed between two network domains operable to carry Signaling System No. 7 (SS7) traffic of different types, comprising:
  program code to establish a first link segment with a first network domain operating to carry SS7 traffic in a first type;
  program code to establish a second link segment with a second network domain operating to carry SS7 traffic in a second type; and
  program code to establish a linkage structure using Level-2 Message Transfer Part (MTP2) of said SS7 traffic between said first and second link segments, wherein said program code to establish a linkage structure further includes negotiating a Message Signal Unit (MSU) transfer rate between a first interface operable in association with said first link segment and a second interface operable in association with said second link segment.

53. The computer readable medium as set forth in claim 52, wherein program code to establish said first link segment includes program code for creating a first interface operable with a protocol selected from the group consisting of: DS0, RS232, RS449, V.35, T1, E1, J1 and Ethernet protocol.

54. The computer readable medium as set forth in claim 52, wherein program code to establish said second link segment includes program code for creating a second interface operable with a protocol selected from the group consisting of: DS0, RS232, RS449, V.35, T1, E1, J1 and Ethernet protocol.

55. The computer readable medium as set forth in claim 52, further includes program code for monitoring said first and second link segments.

56. The computer readable medium as set forth in claim 52, further includes program code for monitoring said linkage structure.

* * * * *